(12) United States Patent
Shah-Heydari

(10) Patent No.: US 8,046,451 B2
(45) Date of Patent: Oct. 25, 2011

(54) HIERARCHICAL TREE-BASED PROTECTION SCHEME FOR MESH NETWORKS

(75) Inventor: Shahram Shah-Heydari, Ottawa (CA)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 12/775,262

(22) Filed: May 6, 2010

(65) Prior Publication Data

US 2010/0268817 A1 Oct. 21, 2010

Related U.S. Application Data

(63) Continuation of application No. 11/617,296, filed on Dec. 28, 2006, now Pat. No. 7,774,448, which is a continuation of application No. 10/029,194, filed on Dec. 28, 2001, now Pat. No. 7,203,743.

(51) Int. Cl.
G06F 15/173 (2006.01)
G06F 15/16 (2006.01)

(52) U.S. Cl. ......... 709/223; 709/220; 709/224; 709/252

(58) Field of Classification Search .................. 709/223, 709/220, 224, 252
See application file for complete search history.

(56) References Cited

U.S. PATENT DOCUMENTS

| | | |
|---|---|---|
| 5,138,615 A | 8/1992 | Lamport et al. |
| 5,535,195 A | 7/1996 | Lee |
| 5,781,531 A | 7/1998 | Charny |
| 6,047,331 A | 4/2000 | Medard et al. |
| 6,098,107 A | 8/2000 | Narvaez-Guarnieri et al. |
| 6,134,599 A | 10/2000 | Chiu et al. |
| 6,614,764 B1 | 9/2003 | Rodeheffer et al. |
| 6,704,320 B1 | 3/2004 | Narvaez et al. |
| 6,804,199 B1 | 10/2004 | Kelly et al. |
| 6,845,091 B2 | 1/2005 | Ogier et al. |
| 7,117,273 B1 | 10/2006 | O'Toole et al. |
| 7,203,743 B2 * | 4/2007 | Shah-Heydari ............... 709/223 |
| 7,543,074 B2 | 6/2009 | O'Neal et al. |
| 7,774,448 B2 * | 8/2010 | Shah-Heydari ............... 709/223 |
| 2006/0212596 A1 | 9/2006 | O'Neal et al. |

OTHER PUBLICATIONS

Gardener, et al., "Techniques for Finding Ring Covers in Survivable Networks", Proceedings of 1994 IEEE Global Telecommunication Conference (GLOBECOM '94), 1994 pp. 1862-1866.
Grover, Wayne D., et al., "Cycle-Oriented Distributed Preconfiguration: Ring-like Speed with Mesh-like capacity for Self-planning Network Restoration", Proceedings of 1998 IEEE International Conference on Communication (ICC'98), vol. 1 1998, pp. 537-543.
Gardner, L.M. et al., "Techniques for Finding Ring Covers in Survivable Networks", Proceedings of 1994 IEEE Global Telecommunication Conference (GLOBECOM '94), 1994, pp. 1862-1866.

* cited by examiner

Primary Examiner — Hussein A. Elchanti
(74) Attorney, Agent, or Firm — Kent Daniels; Blake, Cassels & Graydon LLP

(57) ABSTRACT

In a hierarchical tree-based protection scheme, a node in a mesh network is designated as a root node of a spanning hierarchical protection tree and subsequently invites each adjacent node to become its child within the tree. If the inviting node provides a more capacious protection path to the root node than is currently enjoyed by the invitee, the invitee designates the inviting node as its primary parent and assumes a new tree position. Otherwise, the invitee designates the inviting node as a backup parent. A node assuming a new tree position invites all adjacent nodes except its parent to become its child. The invitations propagate throughout the network until a spanning hierarchical protection tree is formed. Upon a subsequent failure of a straddling link, the tree may be used to re-route data. Further, given a tree link failure, protection switching is quickly achieved at a disconnected node through use of a backup parent as the new primary parent. Dynamic tree reconfiguration in the event of network topology changes may be limited to the network area surrounding the change.

12 Claims, 24 Drawing Sheets

| | a | b | c | d | e | f | g | h | i | j | k |
|---|---|---|---|---|---|---|---|---|---|---|---|
| | current node ID | current tree position | parent node information ||||||||| 
| | | | parent node ||| first backup parent node ||| second backup parent node |||
| | | | node ID | associated current node tree position | capacity to root | node ID | associated current node tree position | capacity to root | node ID | associated current node tree position | capacity to root |
| 1 | N1 | - | N3 | 1.1 | 12 | | | | | | |
| 2 | N2 | - | N3 | 1.2 | 10 | N1 | 1.1.1 | 5 | | | |
| 3 | N3* | 1 | - | - | - | | | | - | - | - |
| 4 | N4 | - | N3 | 1.3 | 7 | N1 | 1.1.2 | 6 | | | |
| 5 | N5 | - | N3 | 1.4 | 8 | | | | | | |
| 6 | N6 | - | | | 0 | | | | | | |

← 600

| | a | b | c | d | e | f |
|---|---|---|---|---|---|---|
| | node ID | current children ||||| 
| 1 | N1 | | | | | |
| 2 | N2 | N1 | | | | |
| 3 | N3* | N1 | N2 | N4 | N5 | |
| 4 | N4 | | | | | |
| 5 | N5 | | | | | |
| 6 | N6 | | | | | |

| | | parent node information | | | | | | | | |
|---|---|---|---|---|---|---|---|---|---|---|
| | | parent node | | | first backup parent node | | | second backup parent node | | |
| current node ID | current tree position | node ID | associated current node tree position | capacity to root | node ID | associated current node tree position | capacity to root | node ID | associated current node tree position | capacity to root |
| a | b | c | d | e | f | g | h | i | j | k |
| 1 | N1 | - | N3 | 1.1 | 12 | N4 | 1.3.1 | 6 | | | |
| 2 | N2 | - | N3 | 1.2 | 10 | N1 | 1.1.1 | 5 | | | |
| 3 | N3* | 1 | - | - | - | - | - | - | - | - | - |
| 4 | N4 | - | N3 | 1.3 | 7 | N1 | 1.1.2 | 6 | | | |
| 5 | N5 | - | N3 | 1.4 | 8 | - | - | - | | | |
| 6 | N6 | - | N4 | 1.3.2 | 4 | | | | | | |

← 600

| | current children | | | | | |
|---|---|---|---|---|---|---|
| node ID | | | | | | |
| a | b | c | d | e | f | |
| 1 | N1 | | | | | |
| 2 | N2 | | | | | |
| 3 | N3* | N1 | N2 | N4 | N5 | |
| 4 | N4 | N6 | | | | |
| 5 | N5 | | | | | |
| 6 | N6 | | | | | |

Table 600:

| | a | b | c | d | e | f | g | h | i | j | k |
|---|---|---|---|---|---|---|---|---|---|---|---|
| | current node ID | current tree position | parent node | | | first backup parent node | | | second backup parent node | | |
| | | | node ID | associated current node tree position | capacity to root | node ID | associated current node tree position | capacity to root | node ID | associated current node tree position | capacity to root |
| 1 | N1 | - | N3 | 1.1 | 12 | N4 | 1.3.1 | 6 | N1 | 1.1.1 | 5 |
| 2 | N2 | - | N3 | 1.2 | 10 | N5 ~~N1~~ | 1.4.1 ~~1.1.1~~ | 8 ~~5~~ | - | - | - |
| 3 | N3* | 1 | - | - | - | - | - | - | - | - | - |
| 4 | N4 | - | N3 | 1.3 | 7 | N1 | 1.1.2 | 6 | - | - | - |
| 5 | N5 | - | N3 | 1.4 | 8 | - | - | - | - | - | - |
| 6 | N6 | - | N4 | 1.3.2 | 4 | - | - | - | - | - | - |

Table 610:

| | a | b | c | d | e | f |
|---|---|---|---|---|---|---|
| | node ID | current children | | | | |
| 1 | N1 | | | | | |
| 2 | N2 | N1 | | | | |
| 3 | N3* | N1 | N2 | N4 | N5 | |
| 4 | N4 | N6 | | | | |
| 5 | N5 | | | | | |
| 6 | N6 | | | | | |

Table 800:

| current node ID | current tree position | parent node | | | first backup parent node | | | second backup parent node | | |
|---|---|---|---|---|---|---|---|---|---|---|
| | | node ID | associated current node tree position | capacity to root | node ID | associated current node tree position | capacity to root | node ID | associated current node tree position | capacity to root |
| N1 | - | N3 | 1.1 | 12 | N4 | 1.3.1 | 6 | N2 | 1.2.1 | 5 |
| N2 | - | N3 | 1.2 | 10 | N1 | 1.1.1 | 5 | - | - | - |
| N3* | 1 | - | - | - | - | - | - | - | - | - |
| N4 | - | N3 | 1.3 | 7 | N1 | 1.1.2 | 6 | N6 / ~~N6~~ | 1.4.1 / ~~1.2.2.1~~ | 4 / ~~4~~ |
| N5 | - | N3 / ~~N2~~ | 1.4 / ~~1.2.2~~ | 8 / ~~9~~ | N3 | 1.4 | 8 | | | |
| N6 | - | N5 / ~~N4~~ / ~~N5~~ | 1.4.1 / ~~1.3.2~~ / ~~1.2.2.2~~ | 8 / ~~4~~ / ~~8~~ | N4 | 1.3.2 | 4 | | | |

← 800

Table 810:

| node ID | current children | | | | |
|---|---|---|---|---|---|
| N1 | | | | | |
| N2 | ~~N5~~ | | | N5 | |
| N3* | N1 | N2 | N4 | | |
| N4 | | | | | |
| N5 | N6 | | | | |
| N6 | | | | | |

HIERARCHICAL TREE-BASED PROTECTION SCHEME FOR MESH NETWORKS

CROSS REFERENCE TO RELATED APPLICATIONS

This application is a continuation of application Ser. No. 11/617,296, filed Dec. 28, 2006, which is a continuation of application Ser. No. 10/029,194, filed Dec. 28, 2001, now U.S. Pat. No. 7,203,743, both of which are hereby incorporated by reference hereinto in their entirety.

FIELD OF THE INVENTION

The present invention relates to network protection schemes, and more particularly to protection schemes applicable to mesh networks.

BACKGROUND OF THE INVENTION

Mesh networks have attracted significant attention from telecommunications providers in recent years for their scalability and flexibility in comparison to traditional SONET/SDH networks.

Various protection schemes have been employed in mesh networks to promote network robustness. For example, network protection cycles (as disclosed in Wayne D. Grover, Demetrious Stamatelakis, "Cycle-Oriented Distributed Pre-configuration: Ring-like speed with mesh-like capacity for self-planning Network Restoration", *Proceedings of* 1998 *IEEE International Conference on Communication (ICC '98)*, Vol. 1, pp. 537-543, 1998, which is hereby incorporated by reference hereto) and ring covers (as disclosed in L. M. Gardner et al, "Techniques for finding Ring Covers in Survivable Networks", *Proceedings of* 1994 *IEEE Global Telecommunication Conference (GLOBECOM '94)*, pp. 1862-1866, 1994, which is hereby incorporated by reference hereto) have each been used to essentially form protection rings with shared bandwidth in mesh networks.

While network protection cycles and ring covers may provide satisfactory bandwidth preservation, these schemes involve algorithms that are computationally intensive. In particular, determination of a protection ring or cycle path requires each network node to have knowledge of the entire network topology. As a result, any change in network topology demands a re-execution of the algorithm at every node. Disadvantageously, protection path processing must occur even at nodes that are distant from the network node(s) that have changed or failed, which may reduce network efficiency.

What is needed is a mesh network protection scheme that overcomes at least some of the above-noted disadvantages.

SUMMARY OF THE INVENTION

In a hierarchical tree-based protection scheme, a mesh network node is designated as a root node of a hierarchical protection tree. The root node invites each adjacent node to become its child within the tree. If the inviting node provides a more capacious protection path to the root node than is currently enjoyed by the invitee, the invitee designates the inviting node as its primary parent and assumes a new tree position. Otherwise, the invitee designates the inviting node as a backup parent. A node assuming a new tree position invites all adjacent nodes except its parent to become its child. The invitations propagate throughout the network until a spanning hierarchical protection tree is formed. Upon a subsequent failure of a straddling link, the tree may be used to re-route data. Further, given a tree link failure, protection switching is quickly achieved at a disconnected node through use of a backup parent as the new primary parent. Dynamic tree reconfiguration in the event of network topology changes may be limited to the network area surrounding the change.

In accordance with an aspect of the present invention there is provided a method of extending a spanning hierarchical protection tree in a mesh network comprising: at a current node, receiving an invitation to become a child of a first adjacent node; if a minimum capacity along a protection path from the current node to a root node of the spanning hierarchical protection tree which visits the first adjacent node is greater than a minimum capacity of any existing protection path from the current node to the root node designating the first adjacent node as a primary parent of the current node in the tree; and from the current node, sending an invitation to become a child of the current node in the tree to each adjacent node of the current node that is not the first adjacent node.

In accordance with another aspect of the present invention there is provided a method of reconnecting a node disconnected from a spanning hierarchical protection tree in a mesh network to the spanning hierarchical protection tree comprising: designating a backup parent of the disconnected node in the tree to be a primary parent of the disconnected node in the tree; and from the disconnected node, sending an invitation to become a child of the disconnected node in the tree to each adjacent node of the disconnected node that is not the primary parent.

In accordance with still another aspect of the present invention there is provided a method of connecting an auxiliary node to a spanning hierarchical protection tree in a mesh network comprising: receiving an invitation from each adjacent node of the auxiliary node for the auxiliary node to become a child of the adjacent node; and designating as a primary parent of the auxiliary node the one adjacent node that is visited by a protection path from the auxiliary node to a root node of the spanning hierarchical protection tree whose minimum capacity is at least as large as the largest minimum capacity of all existing protection paths from the auxiliary node to the root node.

In accordance with yet another aspect of the present invention there is provided a computing device comprising: a processor; memory in communication with the processor, storing processor readable instructions adapting the device to extend a spanning hierarchical protection tree in a mesh network by at a current node, receiving an invitation to become a child of a first adjacent node; and if a minimum capacity along a protection path from the current node to a root node of the spanning hierarchical protection tree which visits the first adjacent node is greater than a minimum capacity of any existing protection path from the current node to the root node, designating the first adjacent node as a primary parent of the current node in the tree.

In accordance with still another aspect of the present invention there is provided a computing device comprising: a processor; memory in communication with the processor, storing processor readable instructions adapting the device to reconnect a node disconnected from a spanning hierarchical protection tree in a mesh network to the spanning hierarchical protection tree by designating a backup parent of the disconnected node in the tree to be a primary parent of the disconnected node in the tree; and from the disconnected node, sending an invitation to become a child of the disconnected node in the tree to each adjacent node of the disconnected node that is not the primary parent.

In accordance with yet another aspect of the present invention there is provided a computing device comprising: a processor; memory in communication with the processor, storing processor readable instructions adapting the device to connect an auxiliary node to a spanning hierarchical protection tree in a mesh network by receiving an invitation from each adjacent node of the auxiliary node for the auxiliary node to become a child of the adjacent node; and designating as a primary parent of the auxiliary node the one adjacent node that is visited by a protection path from the auxiliary node to a root node of the spanning hierarchical protection tree whose minimum capacity is at least as large as the largest minimum capacity of all existing protection paths from the auxiliary node to the root node.

In accordance with still another aspect of the present invention there is provided a computing device comprising: a processor; memory in communication with the processor, storing processor readable instructions adapting the device to connect an auxiliary node to a spanning hierarchical protection tree in a mesh network by requesting an invitation from each adjacent node of the auxiliary node for the auxiliary node to become a child of the adjacent node; from each the adjacent node, receiving an invitation to become a child of the adjacent node; and for each the adjacent node, if a minimum capacity along a protection path from the auxiliary node to a root node of the spanning hierarchical protection tree which visits the adjacent node is greater than a minimum capacity of any existing protection path from the auxiliary node to the root node, designating the adjacent node as a primary parent of the auxiliary node in the tree; and from the auxiliary node, sending an invitation to become a child of the auxiliary node in the tree to each further adjacent node of the auxiliary node that is not the primary parent adjacent node.

In accordance with yet another aspect of the present invention there is provided a computer readable medium storing computer software that, when loaded into a computing device, adapts the device to extend a spanning hierarchical protection tree in a mesh network by: at a current node, receiving an invitation to become a child of a first adjacent node; and if a minimum capacity along a protection path from the current node to a root node of the spanning hierarchical protection tree which visits the first adjacent node is greater than a minimum capacity of any existing protection path from the current node to the root node, designating the first adjacent node as a primary parent of the current node in the tree.

In accordance with still another aspect of the present invention there is provided a computer readable medium storing computer software that, when loaded into a computing device, adapts the device to reconnect a node disconnected from a spanning hierarchical protection tree in a mesh network to the spanning hierarchical protection tree by: designating a backup parent of the disconnected node in the tree to be a primary parent of the disconnected node in the tree; and from the disconnected node, sending an invitation to become a child of the disconnected node in the tree to each adjacent node of the disconnected node that is not the primary parent.

In accordance with yet another aspect of the present invention there is provided a computer readable medium storing computer software that, when loaded into a computing device, adapts the device to connect an auxiliary node to a spanning hierarchical protection tree in a mesh network by: receiving an invitation from each adjacent node of the auxiliary node for the auxiliary node to become a child of the adjacent node; and designating as a primary parent of the auxiliary node the one adjacent node that is visited by a protection path from the auxiliary node to a root node of the spanning hierarchical protection tree whose minimum capacity is at least as large as the largest minimum capacity of all existing protection paths from the auxiliary node to the root node.

In accordance with still another aspect of the present invention there is provided a computer readable medium storing computer software that, when loaded into a computing device, adapts the device to connect an auxiliary node to a spanning hierarchical protection tree in a mesh network by: requesting an invitation from each adjacent node of the auxiliary node for the auxiliary node to become a child of the adjacent node; from each the adjacent node, receiving an invitation to become a child of the adjacent node; and for each the adjacent node, if a minimum capacity along a protection path from the auxiliary node to a root node of the spanning hierarchical protection tree which visits the adjacent node is greater than a minimum capacity of any existing protection path from the auxiliary node to the root node, designating the adjacent node as a primary parent of the auxiliary node in the tree; and from the auxiliary node, sending an invitation to become a child of the auxiliary node in the tree to each further adjacent node of the auxiliary node that is not the primary parent adjacent node.

In accordance with yet another aspect of the present invention there is provided a computer readable medium storing computer software that, when loaded into a computing device, adapts the device to extend a spanning hierarchical protection tree in a mesh network by: at a current node, receiving an invitation to become a child of an adjacent node, the invitation providing an indication of a minimum capacity of a protection path from the current node to a root node of the spanning hierarchical protection tree which visits the adjacent node; and designating the adjacent node as a primary parent in the tree of the current node if the indicated minimum capacity is greater than a minimum capacity of any existing protection path from the current node to the root node.

In accordance with still another aspect of the present invention there is provided a computer readable medium storing computer software that, when loaded into a computing device, adapts the device to reconnect a node disconnected from a spanning hierarchical protection tree in a mesh network to the spanning hierarchical protection tree by: designating a backup parent of the disconnected node in the tree to be a primary parent of the disconnected node in the tree; and from the disconnected node, sending an invitation to become a child of the disconnected node in the tree to each adjacent node of the disconnected node that is not the primary parent, the invitation providing an indication of a minimum capacity of a protection path from the adjacent node to a root node of the spanning hierarchical protection tree which visits the disconnected node.

In accordance with yet another aspect of the present invention there is provided a computer readable medium storing computer software that, when loaded into a computing device, adapts the device to connect an auxiliary node to a spanning hierarchical protection tree in a mesh network by: receiving an invitation from each adjacent node of the auxiliary node for the auxiliary node to become a child of the adjacent node, the invitation providing an indication of a minimum capacity of a protection path from the auxiliary node to a root node of the spanning hierarchical protection tree which visits the adjacent node; and designating as a primary parent of the auxiliary node one adjacent node whose invitation indicates a minimum capacity at least as large as the minimum capacity indicated in each other invitation.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate an example embodiment of this invention:

FIGS. 6A to 6J illustrate the protection scheme data of network nodes N1 to N6 at the stages of tree formation illustrated in FIGS. 5A to 5J respectively;

FIG. 8 illustrates the protection scheme data of network nodes N1 to N6 after the dynamic tree reconfiguration illustrated in FIGS. 7A and 7B is completed;

DETAILED DESCRIPTION

Figure 1:
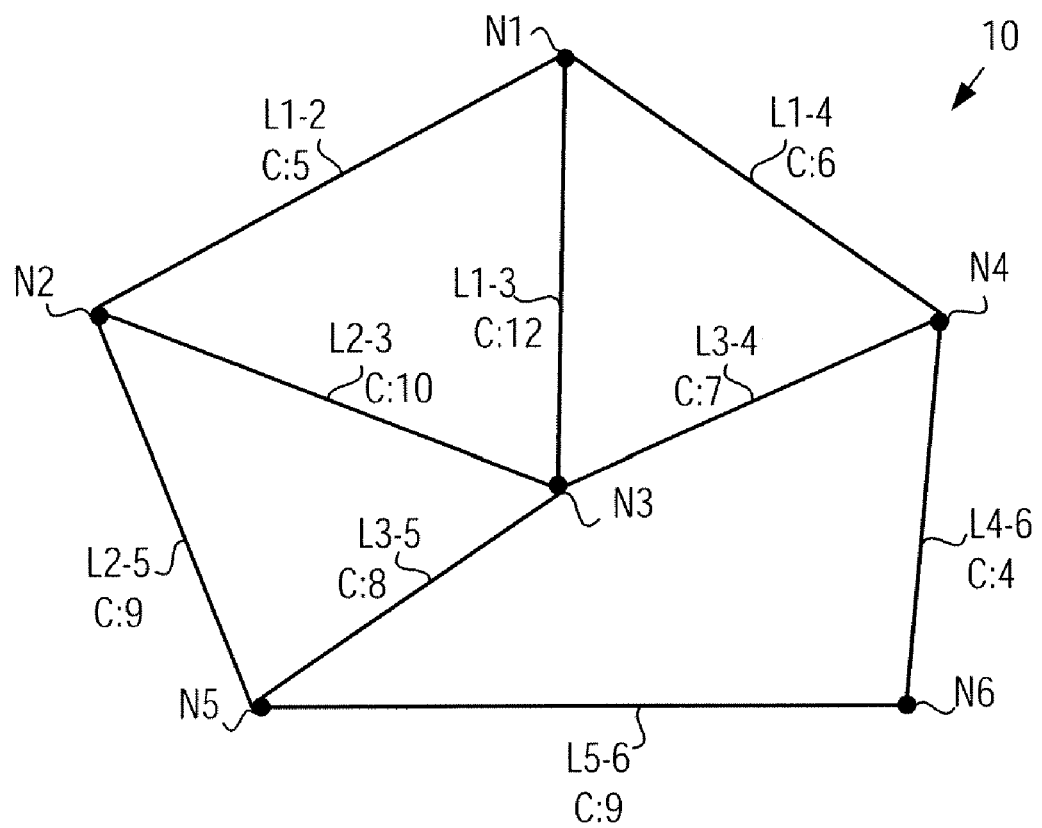
FIG. 1 illustrates a mesh network comprising six nodes N1 to N6 exemplary of the present invention.

FIG. 1 illustrates an exemplary mesh communications network 10 which implements a hierarchical tree-based protection scheme according to the present invention. The network 10 comprises six nodes N1 to N6 and nine links L1-2, L1-3, L1-4, L2-3, L2-5, L3-4, L3-5, L4-6 and L5-6 interconnecting the six nodes. The network 10 of the present embodiment is a long-haul optical data network; however alternative embodiments may comprise networks of a different scope (e.g. a metro network), may be capable of carrying other signals (e.g. voice), and may comprise a different transmission medium rather than optical fiber (e.g. coaxial cable or twisted pair).

Each of the nine links L1-2, L1-3, L1-4, L2-3, L2-5, L3-4, L3-5, L4-6 and L5-6 comprises an interconnection between two nodes, which interconnection may comprise a single optical fiber, a bundle of fibers (i.e. a trunk), or a logical interconnection representing more than one physical link for example. The name of the link identifies the two nodes interconnected by that link (e.g. link L1-2 interconnects nodes N1 and N2, link L3-5 interconnects nodes N3 and N5, etc.). Directly interconnected nodes are referred to as "adjacent nodes" or "neighbors". It will be appreciated that not each node of the present embodiment has all other nodes as its neighbors (i.e. the network 10 is not a complete graph).

Each of the nine links has a working capacity and a protection capacity. As known to those skilled in the art, the working capacity represents bandwidth which is available to carry data during normal network operation. The protection capacity, on the other hand, is bandwidth which is reserved for carrying auxiliary data in exceptional circumstances. For example, in the present embodiment the protection capacity is used to carry re-routed network traffic when a portion of the network has failed. It will be appreciated that the total capacity of a link is the sum of the link's working capacity and protection capacity. The protection capacity of each link is indicated in FIG. 1 alongside the link with a "C:" prefix (e.g. the protection capacity of link L1-2 is 5). The working capacity is not indicated in FIG. 1.

Figure 2:
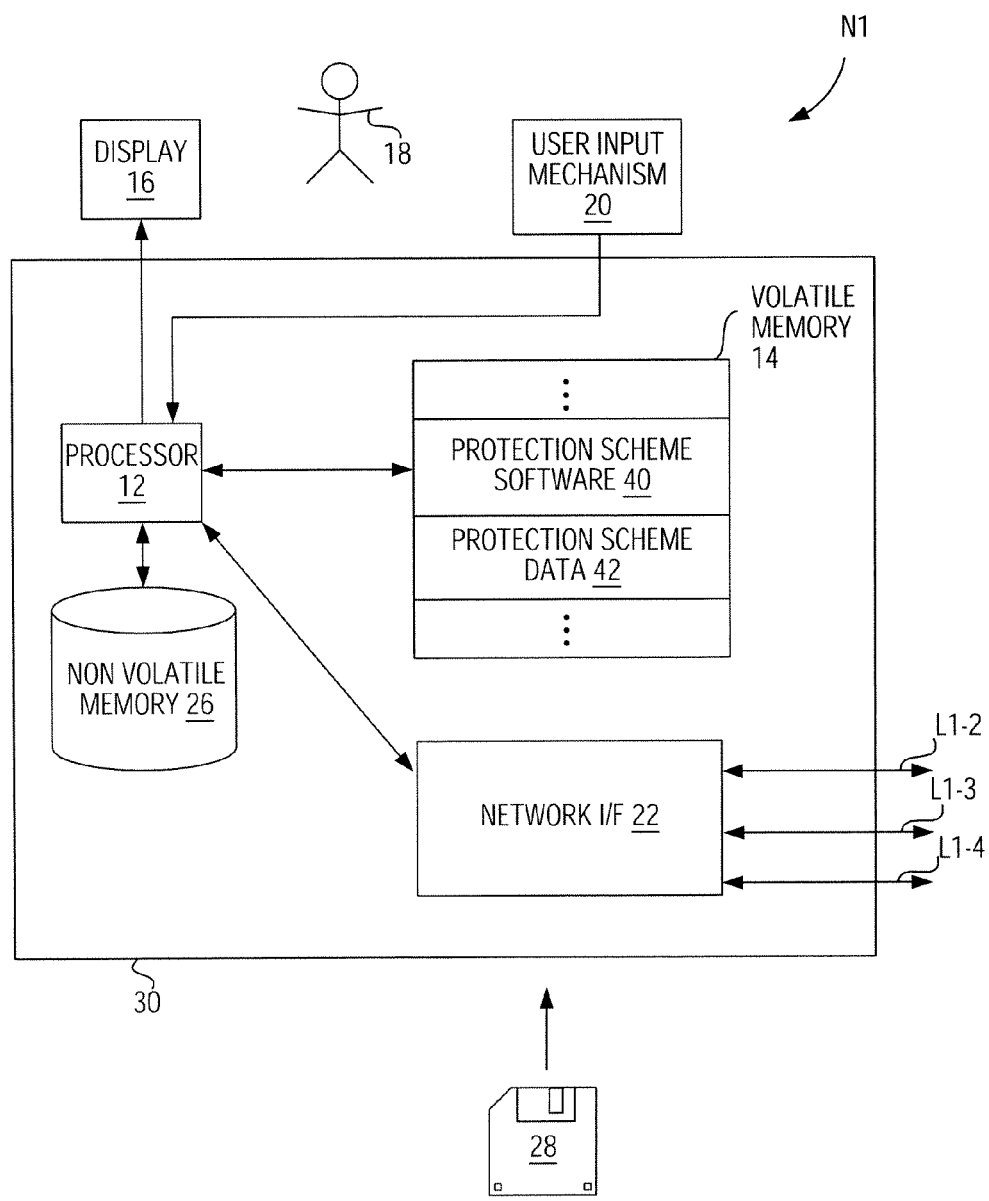
FIG. 2 schematically illustrates an architecture of a network node exemplary of an embodiment of the present invention.

FIG. 2 illustrates the architecture of an exemplary node N1. Nodes N2 to N6 (FIG. 1) are substantially identical. Node N1 is a network element, such as a switch or multiplexer for example, which has been configured to implement the hierarchical tree-based protection scheme of the present embodiment. Node N1 comprises a processor 12 in communication with volatile memory 14 (e.g. RAM) as well as non-volatile memory 26 (e.g. a hard drive). The processor 12 is further interconnected with a network interface 22 which permits the node N1 to communicate with other network nodes. In the case of the illustrated node N1, the interface 22 permits communication across links L1-2, L1-3 and L1-4 to nodes N2, N3 and N4 respectively.

The volatile memory 14 of node N1 stores executable protection scheme software 40 which implements the hierarchical tree-based protection scheme of the present embodiment. The software 40 comprises a message-driven event handling loop that is executed by the node N1 during the operation of the network 10. The execution of this loop results in both the initial formation of a spanning hierarchical protection tree in the network 10 and the dynamic updating of the tree in the event of a subsequent network topology change. The protection scheme software 40 may be loaded into the volatile memory 14 from any suitable computer readable medium, such as a removable optical or magnetic disk 28, or from resident non-volatile memory 26 such as a hard drive or a read only memory chip. Additional software, such as software which provides the element 30 with the capability to operate as a switch or multiplexer for example (not illustrated), may also be stored in volatile memory 14. Volatile memory 14 further contains protection scheme data 42 which is utilized by the protection scheme software 40 during formation and maintenance of the hierarchical protection tree.

Node N1 includes a display 16 and a user input mechanism (UIM) 20 which permit a network operator 18 to interact with the software 40. Display 16 is a conventional display device, such as a CRT, flat-screen monitor or liquid crystal display and may form part of the computing element 30 comprising the node N1. The user input mechanism 20 is a device or devices (e.g. a keyboard and/or a mouse) capable of generating user input representative of commands for operating the software 40. The UIM 20 may form part of the network element 30 which comprises the node N1 and may thus be situated at a location that is remote from computing element 30 (e.g. at a central network operator location). Alternatively, node N1 may not include a dedicated display 16 and UIM 20; rather, a central display and UIM may be used to control each network node.

Figure 3:
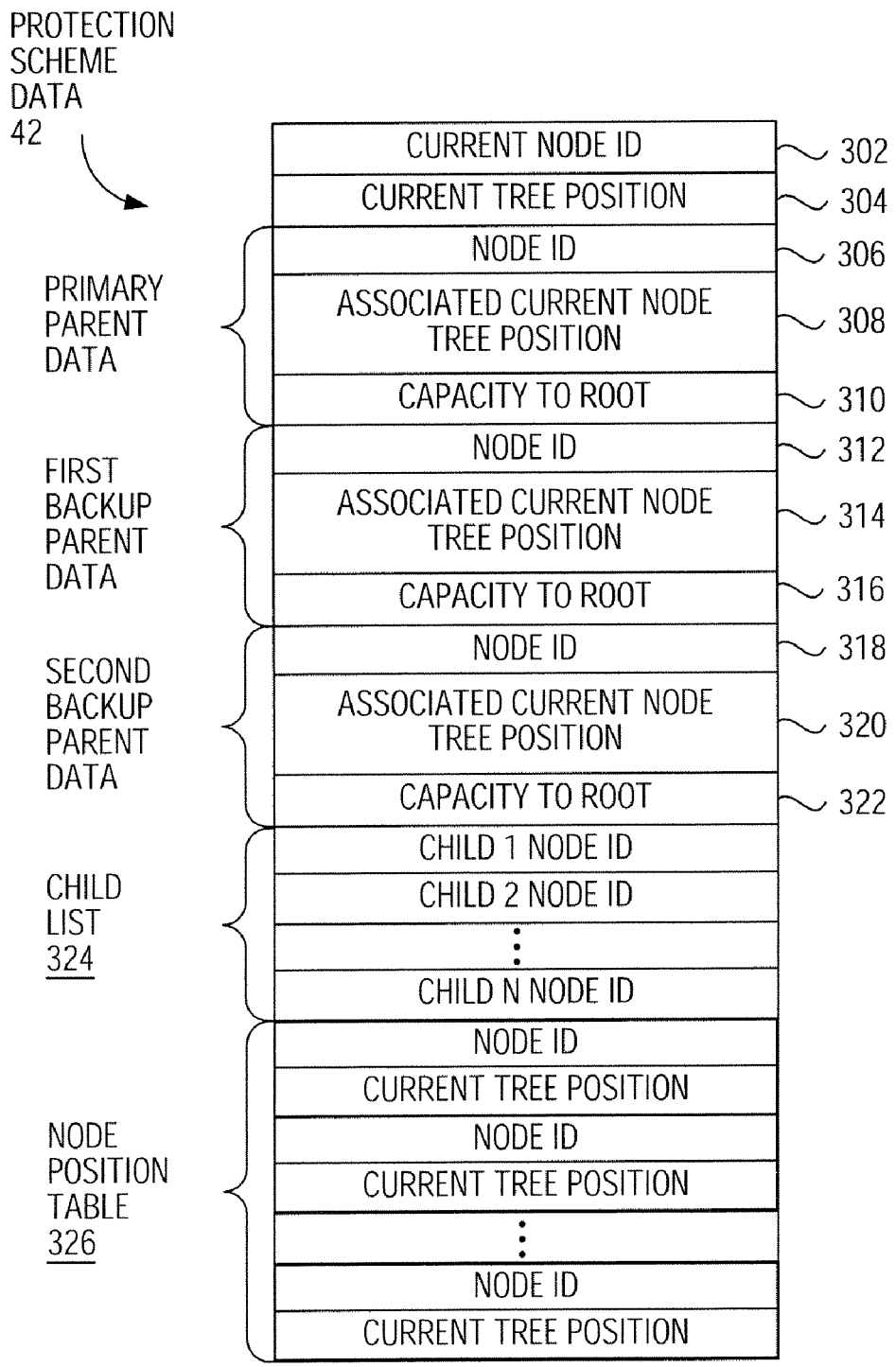
FIG. 3 illustrates protection scheme data that may be maintained by the network node of FIG. 2.

FIG. 3 illustrates the protection scheme data 42 that is maintained by the node N1. Similar data is maintained by the other network nodes (except the root node of the hierarchical protection tree, which does not maintain all of the fields of the protection scheme data 42, as will be described). The data 42 includes a current node ID field 302 which uniquely identifies the current node within the network (e.g. "N1") and a current tree position field 304 which identifies the position of the instant node within the hierarchical protection tree (the latter field is only used by the root node, as will be described).

The protection scheme data 42 also includes a set of primary parent node data fields 306, 308 and 310. The fields 306 and 310 contain the node ID and protection capacity to the root node (from the current node), respectively, of the current node's primary (i.e. direct) parent. Field 308 represents the hierarchical protection tree position of the current node and is included within the primary parent node data fields because it is dependent on the tree position of the primary parent. In the present embodiment, the current tree position indicator is of the format "$I_1.I_2 \ldots I_{N-1}.I_N$", where $I_1$ is a positive integer identifying the root node of the hierarchical protection tree, $I_2$ is a positive integer identifying a child of the root node, $I_{N-1}$ is a positive integer identifying the parent of the current node, and $I_N$ is a positive integer identifying the current node. The tree position indicator of each node other than the root node will comprise at least two positive integers, with each integer being separated from the others by a period ("."). The number of integers in a tree position indicator thus reflects the node's level in the tree (e.g. a tree position indicator of "1.3.2" indicates that the current node is at the third level of the hierarchical protection tree and that the current node's grandparent is the root node, which is located at the first or "root" level of the tree). These integers may be selected in any way such that each current tree position indicator is unique. It will be appreciated that the integers comprising the tree position indicator do not necessarily correspond to the node IDs of the current node or its ancestors. The manner of generating unique tree position indicators will become evident in the context of the description of the network's operation, which is provided below.

Two further sets of fields 312, 314, 316 and 318, 320, 322 contain information analogous to fields 306, 308, 310 for the backup parent node and second backup parent node (respectively) of the current node. As will be appreciated, the backup parent nodes provide alternate connectivity to the hierarchical protection tree in the event of a loss of connectivity with a node's parent during network operation. More specifically, the first backup parent node (if one exists) will become the primary parent node in the event that connectivity with the primary parent is lost; subsequently, if connectivity with the first backup parent is lost, the second backup node (if one exists) will be used as the primary parent node. It will be appreciated that the fields 314 and 320 represent the tree position of the current node in the event that the associated first or second backup parent (respectively) becomes the primary parent. Other embodiments may have more than two backup parents, depending upon network configuration (i.e. depending upon the maximum number of adjacent nodes of any network node). To improve system flexibility, it may be desirable to allocate space in volatile memory 14 for more backup parents than are currently possible so that a future increase in the maximum number of possible backup parents of a node in the network will be supported. It will be appreciated that the primary, first backup and second backup fields comprise a "sorted lookup table" of parent node information (with the sorting being based on decreasing minimum protection capacity).

It should be appreciated that the capacity fields 310, 316 and 322 represent the minimum protection capacity (i.e. the lowest capacity link or "hop") along the protection path between the current node and the root node which "visits" the parent, backup parent or second backup parent node respectively. A node's capacity to the root may be referred to herein as the "minimum capacity" to reflect this fact, i.e. to indicate that a protection path to the root is constrained by the "weakest link" or "narrowest pipe" along the way. The root node of the hierarchical protection tree does not maintain the fields 306, 308, 310, 312, 314, 316, 318, 320, and 322, as it has no parent or backup parent nodes.

The protection scheme data 42 also includes a child list 324 (FIG. 3) comprising an array of node IDs of the node's current children in the tree. It will appreciated be that the number of array entries in the list 324 will be at least as large as the maximum number of neighbors of any given network node. As with the backup parent fields, it may be desired to allocate spare entries in child list 324 to provide flexibility of network configuration (e.g. to allow for a future increase in the maximum number of neighbor nodes).

The protection scheme data 42 further includes a node position table 326 (FIG. 3) comprising the node ID and current tree position indicator of each node in the network except the current node. As will be described, the node position table 326 is created during hierarchical protection tree formation and then used in the event of a link failure to determine the path within the hierarchical protection tree through which redirected network traffic should be sent. It will appreciated be that the number of array entries in the table 326 will be at least as large as the number nodes in the network minus one. Again, it may be desired to allocate spare entries in table 326 to allow for a future increase in the number of network nodes.

In overview, a network operator 18 initially selects the network node with the highest overall protection capacity connectivity with its neighbors as the root node of the hierarchical protection tree and configures that node as the root node by interacting with the protection scheme software executing at that node. As a result, the root node sends a message to each of its adjacent nodes inviting the recipient to become its child within the hierarchical protection tree. Each "invitation" message includes information that is needed by the adjacent node for the purpose of assessing whether or not the adjacent node should in fact agree to become a child of the sender. This information primarily comprises the (minimum) protection capacity from the adjacent node to the root node by way of the sending node (which in this case simply comprises the protection capacity between the root node and the adjacent node).

Upon receiving the invitation message, each recipient node compares the received minimum capacity to its current capacity to the root.

If the received minimum capacity is greater than the current capacity, this indicates that the sending node offers a more capacious protection path to the root node than the recipient currently enjoys. In this case, the recipient accepts the offer to become a child of the sending node and thereby assumes a new position in the tree as the child of the sender. Thereafter, in view of its new tree position, the recipient will send similar invitation messages to all of its neighbors (except the sending node) to inform them of its new position and to invite them to configure themselves as its children. As before, the neighbors will accept the recipient's invitation if the protection path to the root node via the sender is a more capacious one than the neighbors currently enjoy. This process continues until invitation messages have propagated outwardly from the root throughout the network to cause a spanning hierarchical protection tree to be formed, with each node processing its received messages asynchronously with respect to the other network nodes. If at any point a node with an existing parent accepts a new node as its parent, the previous parent node will be demoted to a "backup parent" role, with the priority of the backups being determined by decreasing capacity to the root (i.e. the higher the capacity the higher the priority).

If however, in response to the sender's invitation, a recipient node's comparison reveals that the minimum capacity to the root via the sender is not greater than the recipient's current capacity to the root, the recipient will decline the invitation to become the sender's child and will rather designate the sender as a "backup" parent. In this case, the recipient will abstain from sending any messages to its neighbors, in view of the fact that it has not itself assumed a new position in the tree, and the propagation of messages is terminated. Of course, in the case of the root's initial set of messages to its neighbors, the recipient nodes will each accept the sender's invitation to become the sender's child since any access to the root is preferable to the nodes' initial condition of being unconnected (by way of a protection path) to the root.

When the process converges (i.e. when no more messages need to be sent), a hierarchical protection tree will have been formed in the network. This tree will span each network node and will have as its branches the most capacious links in the network between the root node and the other network nodes. The branches of the hierarchical protection tree may then be utilized to re-route network traffic in the event of failure of a straddling link (i.e. non-tree link) failure, as will be described.

If a tree link fails during network operation, protection switching is quickly achieved because the disconnected child node need only perform a "table lookup" (within the protection scheme data 42) to identify its backup parent and promote it to primary parent. Subsequently, the same process as was used to initially form the tree is used to dynamically reconfigure the tree in view of the failure. That is, the reconnected child, which has assumed a new tree position (in view of its acceptance of a new parent) and has therefore acquired a new minimum capacity to the root, invites all of its adjacent nodes (except the new parent) to be its child. The adjacent nodes accept or decline the invitations based on the new minimum capacity, in the same manner as was described above. As will be apparent, the impact of such reconfiguration may be limited to the network area surrounding the reconnected node.

When a new (i.e. auxiliary) node is added to the network, the node is incorporated into the hierarchical protection tree's structure using fundamentally the same process as was used to initially form the tree. The new node initiates the incorporation by initially sending a "request" message to each of its neighbors to cause them to each respond with an invitation message for the new node to become its child. Advantageously, the impact of adding a node in this manner is also limited to the network area surrounding the new node.

Figure 4A:
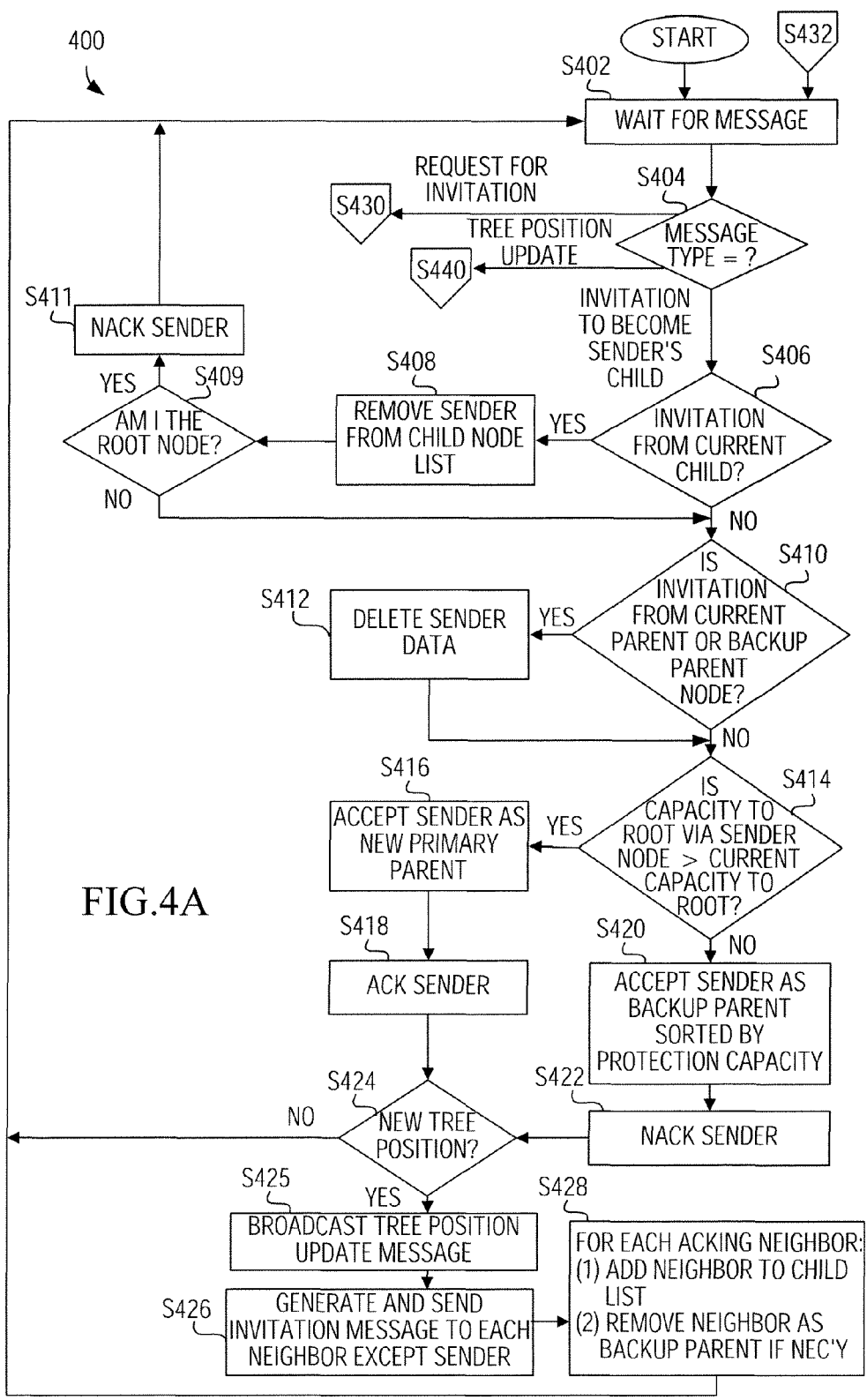
FIGS. 4A, 4B and 4C are a flowchart of steps executed by the network node of FIG. 2 which illustrates a method exemplary of an embodiment of the present invention.
Figure 4B:
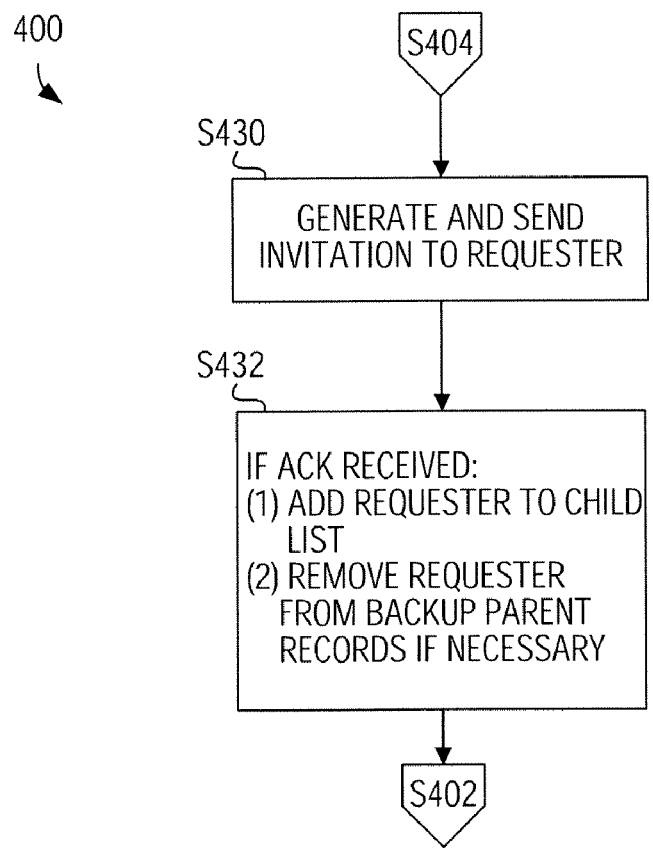
Figure 4C:
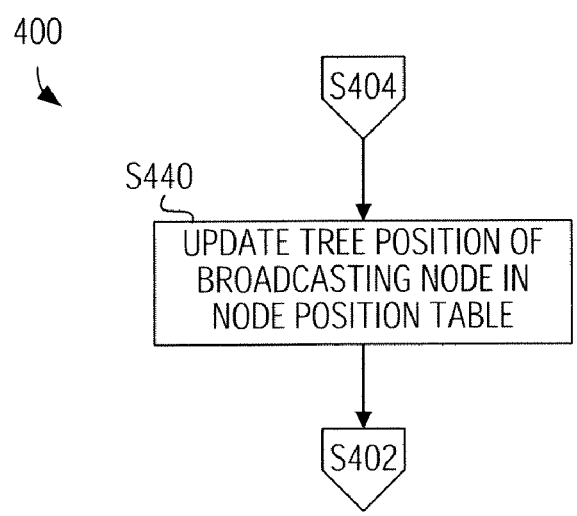

The operation of the present embodiment is illustrated in the flowchart of steps 400 of FIGS. 4A, 4B and 4C as well as FIGS. 5A to 5J and 6A to 6J, with additional reference to FIGS. 2 and 3. The flowchart of FIGS. 4A, 4B and 4C illustrates the message-driven event loop of the protection scheme software 40 executing on each node N1 to N6 in the network 10, which loop is responsible for implementing the hierarchical tree-based protection scheme of the present embodiment. FIGS. 5A to 5J illustrate the network 10 at various stages of hierarchical protection tree formation. FIGS. 6A to 6J illustrate the protection scheme data 42 (except node position table 326) of network nodes N1 to N6 at the stages of tree formation illustrated in FIGS. 5A to 5J respectively. It will be appreciated that the data represented in each row 1 to 6 of the table 600 of FIGS. 6A to 6J is physically maintained at a different network node, and that the child list data represented in each row 1 to 6 of table 610 is maintained at the same respective network nodes.

Various drawing conventions are used in the figures. For example, a circle around a node in any of FIGS. 5B to 5J identifies a node that is presently sending messages to at least some of its neighbors. Moreover, bold lines in FIGS. 5B to 5J represent links that currently comprise branches of the hierarchical protection tree. Finally, bold entries in the tables of FIGS. 6B to 6J represent updated values from the previously illustrated state (i.e. changes from FIGS. 6A to 6I respectively).

It is initially assumed that the protection scheme software 40 is executing in each of the nodes N1 to N6. It is also assumed that the node ID field 302 of each node has been initialized to reflect its own ID ("N1", "N2", etc.) and that the current tree position field 304, associated current node tree position field 308, capacity to root fields 310, 316 and 322, child list 324 and node position table 326 of each node has been zeroed to reflect the fact that none of the network nodes is yet part of a hierarchical protection tree. Each node is also assumed to be cognizant of the protection capacity of each link to which it is connected.

To commence hierarchical protection tree formation, a network operator 18 (FIG. 2) initially examines each node in the network 10 (FIG. 5A) to determine which node has the largest average link capacity. Average link capacity for a node is defined to be the sum of the protection capacities of the links to that node divided by the number of links to that node. A software utility may be executed to facilitate this computation. In the present case, node N3 is determined to have the largest average link capacity (9.25) and is therefore designated by the operator 18 to be the root node (as indicated by the asterisk "*" of FIGS. 5A-5J and FIGS. 6A-6J). More specifically, the operator 18 utilizes the display 16 and UIM 20 (FIG. 2) of node N3 to interact with protection scheme software 40 so as to configure the node N3 as the root node. This action causes the software 40 to assign a current tree position indicator to the field 304 (FIG. 3) maintained by node N3. The software could assign any integer value; in the present example the assigned value is "1". This assigned current tree position indicator for node N3 is parenthetically indicated in FIG. 5A near the associated root node N3 (as all non-zero current tree position indicators will be indicated in the FIGS. 5A to 5J) and is also reflected in table 600 entry 3b of FIG. 6A.

In response to being configured as the root node, the protection scheme software 40 of network node N3 broadcasts a "tree position update" message to each network node. In response, each node updates its node position table 326 (FIG. 3) to indicate that node "N3" has a tree position indicator of "1".

Figure 5A:
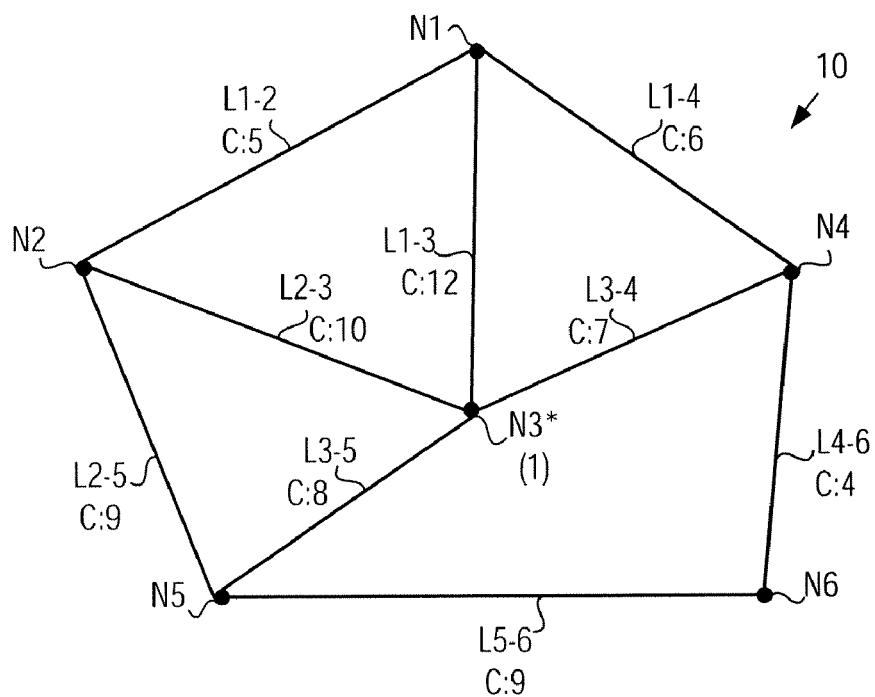
FIGS. 5A to 5J illustrate the network of FIG. 1 at various stages of hierarchical protection tree formation.
Figure 5B:
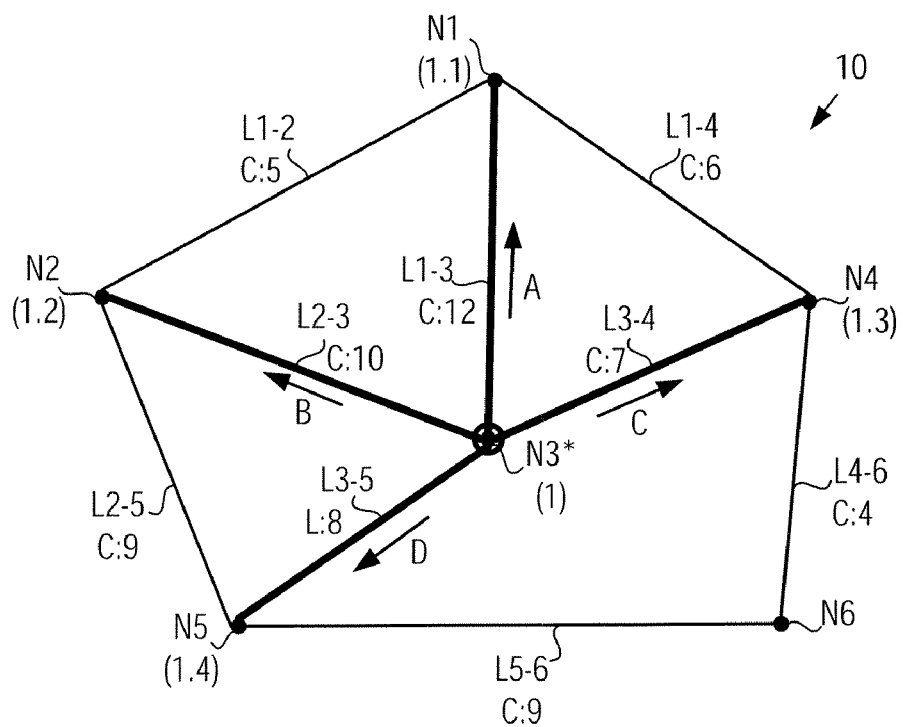

In further response to being configured as the root node, the protection scheme software 40 of network node N3 generates and sends messages to all of its neighbors to invite the recipients to become its children within a hierarchical protection tree. More specifically, node N3 sends four messages A, B, C, and D to adjacent nodes N1, N2, N4, and N5 along links L1-3, L2-3, L3-4 and L3-5 respectively as shown in FIG. 5B. The content of each of the messages A, B, C, D is illustrated in Table I below.

TABLE I

| | CONTENT | | |
|---|---|---|---|
| MESSAGE | NODE ID (field 1) | TREE POSITION (field 2) | CAPACITY TO ROOT (field 3) |
| A | N3 | 1.1 | 12 |
| B | N3 | 1.2 | 10 |
| C | N3 | 1.3 | 7 |
| D | N3 | 1.4 | 8 |

Each message has three fields. The "node ID" field (message field 1) represents the node ID of the sending node (i.e. "N3"). This field will be used by the recipient to assess whether or not a message has previously been received from the sender. The "tree position" field (message field 2) represents the tree position that the recipient will be assigned in the event that it agrees to become a child of the sending node N3. Each tree position indicator is unique. In the present embodiment, this indicator is generated by concatenating the tree position indicator of the sending node with a generated message number, the latter number being based simply upon the order in which the messages are sent. The "capacity to root" field (message field 3) represents the protection capacity to the root node from the recipient node by way of the sending node (which in this case is simply the protection capacity of the link along which the message was sent). The latter field is used by the recipient to determine whether it should accept the sender's invitation to become its child.

Referring first to node N1, the message A is received at node N1 and causes the protection scheme software 40 at that node to advance from its "wait state" (step S402 of FIG. 4A) to step S404. At the latter step, the protection scheme software 40 determines that the message is an "invitation" message for the node N1 to become a child of the sender. Accordingly, in subsequent step S406, the software 40 assesses whether the invitation is from a current child. As will become apparent, this step is performed to ensure that no loops will be created in the forming hierarchical protection tree. Step S406 is achieved by searching the child list 324 portion of the protection scheme data 42 for the sender's node ID "N3". In the present case, the child list 324 is empty, thus the software 40 advances to step S410.

In step S410, the software 40 examines whether the invitation is from either a current parent or backup parent node. The software 40 achieves this by determining whether the current sender's node ID ("N3") appears in any of the parent or backup parent node ID fields 306, 312 and 318. If the examination reveals that the sender's node ID does in fact appear in the primary or backup node ID fields, the sender's information is deleted from the protection scheme data 42, as will be described. However, in the present case the evaluation reveals that node N3 is not currently a parent or a backup parent of node N1.

As a result, in subsequent step S414, the protection scheme software 40 of node N1 compares the received capacity to the root (12) with the its current capacity to the root (0). The latter value is read from the primary parent's "capacity to root" field 310, which is reflected in table 600 entry 1*e* of FIG. 6A. Because the received capacity is greater than the current capacity, step S416 is executed next.

In step S416 the node N1 accepts the sender N3 as its primary parent. It will be appreciated that this effectively causes the link between node N1 and node N3 (i.e. link L1-3) to become a branch of the hierarchical protection tree (as indicated by representation of link L1-3 in bold in FIG. 5B). To accept the sender as its primary parent, the protection scheme software 40 of node N1 stores the received tree position indicator "1.1" (i.e. message field 2) in its associated current node tree position field 308 (as shown in entry 1*d* of table 600 in FIG. 6B). It will be appreciated that the value in this field represents the tree position of the current node in view of its acceptance of node N3 as its parent. The software 40 of node N1 also stores the received node ID "N3" (i.e. message field 1) in its parent node ID field 306 and the received minimum capacity (i.e. message field 3) in the parent "capacity to root" field 310 (as shown in table 600 entries 1*c* and 1*e* of FIG. 6B).

In the subsequent step S418, the software 40 of recipient node N1 generates and sends an acknowledgement message or "ACK" to the sending node N3 to indicate that it has in fact accepted node N3 as its parent in the hierarchical protection tree. Receipt of this "ACK" will cause the node N3 to add the recipient's node ID to its child list 324 to record the addition of node N1 as its child (as shown in table 610 entry 3*b* of FIG. 6B). Moreover, in step S428 node N1 determines that, because node N3 is not presently listed as a backup parent, no steps need to be taken to remove it as a backup parent (the purpose of such removal being to ensure that the hierarchical protection tree has no loops).

After confirming the fact that it has assumed a new tree position in step S424, node N1 broadcasts a "tree position update" message to each network node in step S425 to apprise each node of its new tree position. In response to this message, each recipient updates its node position table 326 (FIG. 3) to indicate that node "N1" has a tree position indicator of "1.1" (steps S404 and S440 of FIG. 4A and FIG. 4B). Then node N1 then generates and sends a message to each of its neighbors except the sending node N3 in step S426 to now invite the recipients to become its children in the tree. This will be described below.

Meanwhile, at nodes N2, N4 and N5, messages B, C and D respectively are received and processed in like manner to node N1's processing of message A. Thus, each of these nodes accepts root node N3 as its parent in the hierarchical protection tree (as reflected by the bold links L2-3, L3-4 and L3-5 of FIG. 5B, as well as the new tree position indicators "1.2", "1.3" and "1.4" which are parenthetically indicated near nodes N2, N4, and N5 respectively). Corresponding updates to those made at node N1 are made to the fields 306, 308 and 310 of each of the nodes N1, N4 and N5 to effect the recipients' acceptance. These updates are shown in table 600 entries 2*c* to 2*e*, 4*c* to 4*e*, and 5*c* to 5*e* of FIG. 6B. As well, the root node N3, upon receiving an "ACK" from each of these nodes, updates its child list 324 to reflect the addition of three children (as shown in table 610 entries 3*c* to 3*e* of FIG. 6B).

Ultimately, each node N2, N4 and N5 executes step S425 of FIG. 4 to broadcast a "tree position update" message to each node (causing each recipient to update its node position table 326 in step S440 of FIG. 4C) and step S426 to generate and send an invitation message to each of its neighbors (except the sending node) for the purpose of inviting the recipients to become its child in the tree. The latter step will be described below.

Figure 5C:
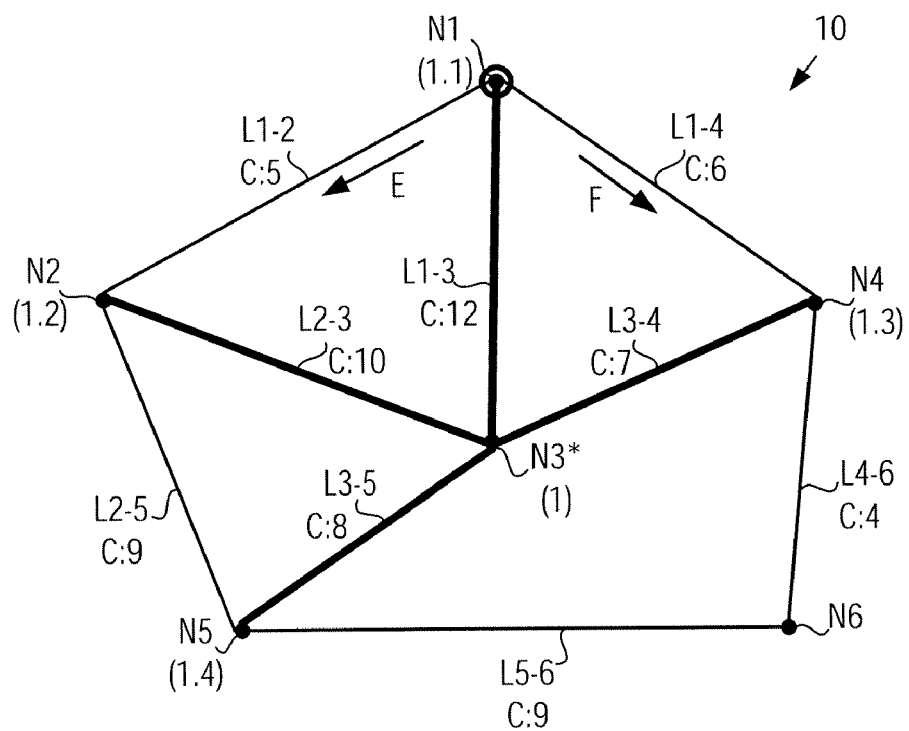

Turning back to node N1, the execution of step S426 causes a message to be generated and sent to each of node N1's neighbors except the node N3 from which the "original" message A was just received. Again, the purpose of these messages is to invite the recipients to become node N3's child at a third level of the hierarchical protection tree (below the root node and node N1). More specifically, node N1 sends two messages E and F to adjacent nodes N2 and N4 along links L1-2 and L1-4 respectively, as shown in FIG. 5C. The content of these messages is illustrated in Table II below.

TABLE II

| | CONTENT | | |
|---|---|---|---|
| MESSAGE | NODE ID (field 1) | TREE POSITION (field 2) | CAPACITY TO ROOT (field 3) |
| E | N1 | 1.1.1 | 5 |
| F | N1 | 1.1.2 | 6 |

The same message format as was used in node N3's messages to its neighbors is used for messages E and F. It will be appreciated that, in the case of message E, the "capacity to root" field (i.e. message field 3) is set to the minimum of the protection capacities of links L1-3 and L1-2 (i.e. 5); in the case of message F, this capacity is set to the minimum of the protection capacities of links L1-3 and L1-4 (i.e. 6).

At node N2, the message E is received and causes the protection scheme software 40 executing at that node to advance from its "wait state" (step S402 of FIG. 4A) through to step S414 via steps S404, S406, and S410 in a similar manner to the processing of message A at node N1. In step S414, the protection scheme software 40 of node N2 compares the received minimum capacity to the root (5) with the node's current capacity to the root via its parent node (10). The latter capacity is read from node N2's "capacity to root" field 310 (which is reflected in table 600 entry 2e of FIG. 6C). In this case, the received capacity is not greater than the current capacity. This indicates that the protection path from node N2 to the root node (N3) via node N1 is not a more capacious protection path to the root as compared with node N2's current direct link to the root node, and that node N1's invitation for node N2 to become it child should therefore not be accepted. As a result, step S420 is executed next.

In step S420, the node N2 accepts the sender as its first backup parent. More specifically, the protection scheme software 40 of node N1 stores the received node ID "N1", tree position indicator "1.1.1" and capacity to root "5" (i.e. message fields 1 to 3) in its first backup parent fields 312, 314 and 316 (as indicated in table 600 entries 2f to 2h of FIG. 6C).

In the subsequent step S422, the software 40 of node N2 generates and sends a negative acknowledgement or "NACK" to the sending node N1 to indicate that it has in fact declined the sender's invitation to become the sender's child in the hierarchical protection tree. Upon confirming that its tree position has not changed in step S424, the node N2 returns to the "wait state" of step S402.

Meanwhile, at node N4 message F is received and processed in like manner to node N2's processing of message E. This results in the node N4 similarly declining to accept node N1 as its primary parent in the tree and instead accepting node N1 as its first backup parent. This acceptance is effected through analogous updates to the first backup parent fields 312, 314 and 316 of node N4 as were made at node N2, which are indicated in table 600 entries 4f to 4h of FIG. 6C. Ultimately, the node N4 also returns to its "wait state" at step S402.

It will be appreciated that, because neither node N2 nor node N4 accepted node N1's invitation to become its child in the hierarchical tree, the shape of the (as yet incomplete) tree in FIG. 5C is unchanged from the tree of FIG. 5B.

Figure 5D:
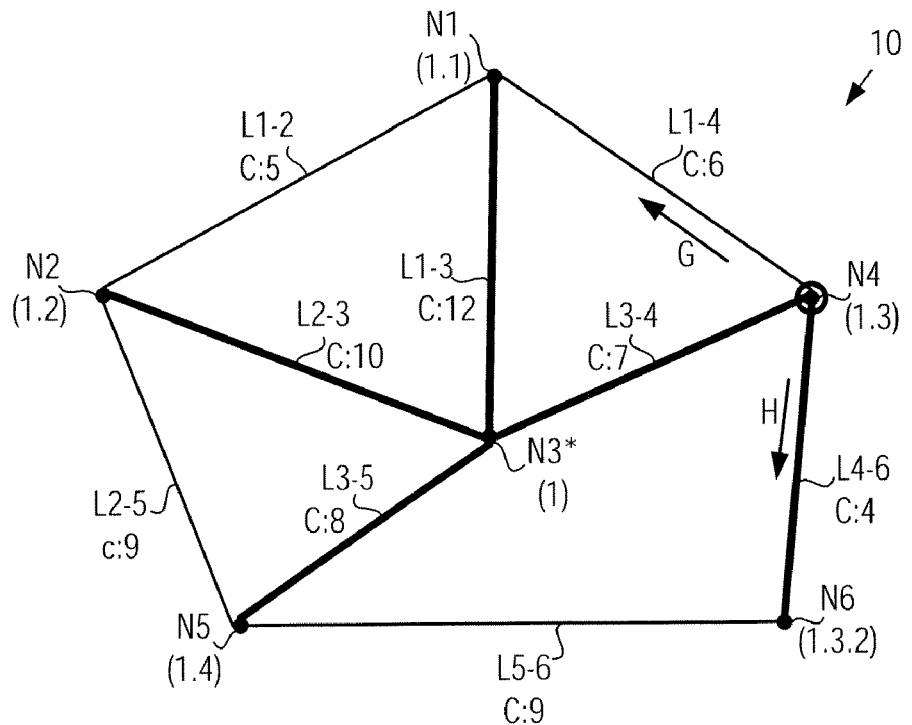

Referring now back to node N4 (which has yet to complete its processing in response to receiving the original invitation message C of FIG. 5B), the execution of step S426 causes a message to be generated and sent to each of node N4's neighbors except the sender of message C (node N3). More specifically, node N4 sends two messages G and H to adjacent nodes N1 and N6 along links L1-4 and L4-6 respectively, as shown in FIG. 5D. The content of these messages is illustrated in Table III below.

TABLE III

| | CONTENT | | |
|---|---|---|---|
| MESSAGE | NODE ID (field 1) | TREE POSITION (field 2) | CAPACITY TO ROOT (field 3) |
| G | N4 | 1.3.1 | 6 |
| H | N4 | 1.3.2 | 4 |

The same message formats are again used for messages G and H as were used for the previous invitation messages. It will be appreciated that, in the case of message G, the "capacity to root" field (i.e. message field 3) is set to the minimum of the protection capacities of links L3-4 and L1-4 (i.e. 6); in the case of message H, this capacity field is set to the minimum of the protection capacities of links L3-4 and L4-6 (i.e. 4).

At node N1, the message G is received and causes the protection scheme software 40 to once again advance from its "wait state" (step S402 of FIG. 4A) through to step S414 as described above. In the step S414, the software 40 of node N1 compares the received minimum capacity to the root (6) with the node's current capacity to the root via its parent node (12). As with messages E and F, the received capacity is not greater than the recipient's current capacity (i.e. the protection path from N1 to the root node via node N4 is not more capacious than the direct link from node N1 to root node N3). Accordingly, node N4's invitation for the node N1 to become its child is not accepted. Rather, the node N1 accepts the sender node N4 as its first backup parent in step S424 and makes the necessary updates to its first backup parent fields 312, 314 and 316 as shown in table 600 entries 1f to 1h of FIG. 6D. In the subsequent step S422, the sending node N4 is "NACKed" and, following a determination that the node's current tree position has not changed in step S424, the node N1 returns to its "wait state" (step S402).

Meanwhile, at node N6 message H is received, and in this case the invitation to become the sender's (node N4's) child is accepted in view of node N6's lack of any existing protection path connectivity to the root node N3. Message H is thus processed in a similar manner to message A, with the recipient node N6 executing the same steps in flowchart 400 and making the requisite updates to its fields 306, 308 and 310 as shown in table 600 entries 6c to 6e (FIG. 6D). Node N6 thus becomes the first third level node in the hierarchical protection tree (below the root node and node N4). It will be appreciated that node N6 has been assigned tree position indicator "1.3.2" despite the absence of any node in the tree with a current tree position indicator "1.3.1". This is a consequence of node N1's failure to accept invitation message G. It will thus be recognized that, in the present embodiment, the existence of a node with a current tree position indicator ending in ".N" at a particular tree level does not connote the existence of another tree position indicator ending in ".N-1" at that level.

Node N6 "ACKs" node N4 is step S424 to confirm its acceptance of node N4's invitation, and in response node N4 updates its child list 324 to reflect its new child N6, as shown in table 610 entry 4b of FIG. 6D, in step S428. Moreover, in step S428 node N4 determines that, because node N6 is not presently listed as a backup parent, no steps need to be taken to remove it as a backup parent.

In view of its new tree position, node N6 now broadcasts a "tree position update" message to each node in step S425 (which messages cause every other node to update their respective node position tables 326) and generates and sends an invitation message to each of its neighbors (except the sending node) in step S426 for the purpose of inviting the recipients to become its child in the tree. This will be described below.

Figure 5E:
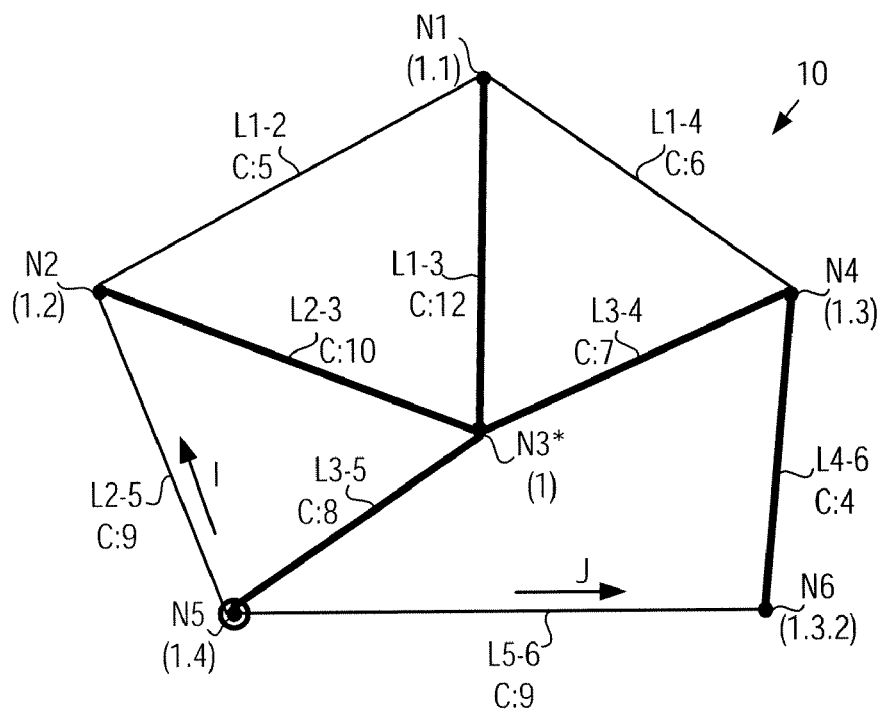

Referring now to node N5 (which has yet to complete its processing in response to receiving initial message D from root node N3), the execution of step S426 causes a message to be generated and sent to each of node N5's neighbors except the sender of message D (node N3). In particular, node N5 sends two invitation messages I and J to adjacent nodes N2 and N6 along links L2-5 and L5-6 respectively, as shown in FIG. 5E. The content of each of these messages is illustrated in Table IV below.

TABLE IV

| MES | NODE ID (field 1) | TREE POSITION (field 2) | CAPACITY TO ROOT (field 3) |
|---|---|---|---|
| | | CONTENT | |
| I | N5 | 1.4.1 | 8 |
| J | N5 | 1.4.2 | 8 |

At node N2, the message I is received and causes the protection scheme software 40 to once again advance from step S402 to step S414 via steps S404 and S406, in the previously described manner. At step S414, the software 40 of node N2 compares the received minimum capacity to the root (8) with the node's current capacity to the root via its parent node (10). Here again, because the received capacity is not greater than the recipient's current capacity to the root, the invitation for node N2 to become a child of node N5 is not accepted. Rather, the node N2 accepts the sender node N5 as a backup parent in step S420. However, because node N2 already has a first backup parent node N1 (as can be seen in table 600 entries 2f to 2h of FIG. 6D), in this case the software 40 sorts the backup parents on the basis of their capacity to the root. In particular, because node N5 provides a more capacious backup protection path (capacity 8) to the root node than node N1 (capacity 5), node N5 is designated as the first backup parent and the node N1 is "demoted" to second backup parent. Accordingly, the values in first backup parent fields 312, 314, 316 are copied to the corresponding second backup parent fields 318, 320, 322, and the first backup parent fields 312, 314 and 316 are overwritten with node N5's information as shown in table 600 entries 2f to 2k of FIG. 6E. In the subsequent step S422, the sending node N5 is "NACKed", and following a confirmation of the fact that node N2's tree position has not changed in step S424, the node N2 returns to its "wait state" (step S402).

Meanwhile, at node N6 message J is received. Because node N6 has not yet completed its event loop processing of message H, however, message J is buffered until such time as it may be processed.

Figure 5F:
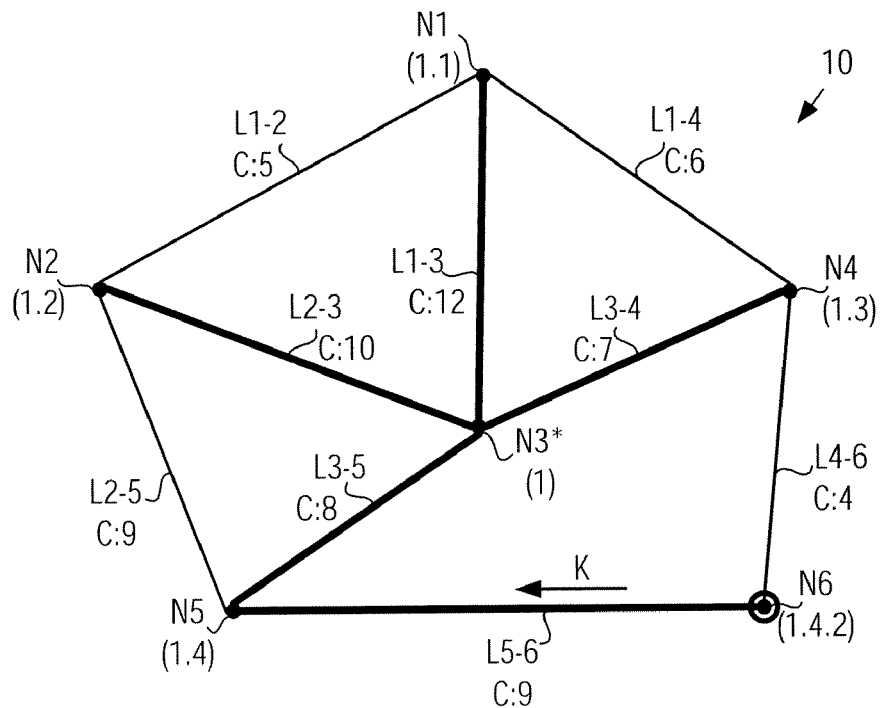

In the meantime, node N6 continues with the processing of message H by executing step S420. This execution causes a message to be generated and sent to each of node N6's neighbors except the sender of message H (node N4). In particular, just one message K is sent to adjacent node N5 along link L5-6, as shown in FIG. 5F. The content of message K is illustrated in Table IV below.

TABLE IV

| MESSAGE | NODE ID (field 1) | TREE POSITION (field 2) | CAPACITY TO ROOT (field 3) |
|---|---|---|---|
| | | CONTENT | |
| K | N6 | 1.3.2.1 | 4 |

It will be appreciated that the "capacity to root" field of message K is set to the minimum of the protection capacities of links L3-4, L4-6 and L5-6 (i.e. 4). It will also be appreciated that the tree position indicator "1.3.2.1". (message field 2) is based on node N6's current tree position indicator of "1.3.2". That is, despite the fact that the processing of message J will ultimately result in N6 assuming a tree position indicator of "1.4.2" (as will be described), due to the buffering of message J pending the completion of the instant processing, the current tree position indicator of node N6 is still "1.3.2".

At node N5, the message K is received and processed in a similar manner as message G (FIG. 5D) was processed, i.e. node N5 declines the sender's invitation to become its child but accepts the sender as its first backup parent. The protection scheme software 40 thus similarly progresses from step S402 to step S424 via steps S404, S406 S410, S414, S420 and S422, and correspondingly updates node N5's first backup parent fields 312, 314, 316 as shown in table 600 entries 5f to 5h of FIG. 6F. Ultimately, node N5 returns to its "wait state" (step S402).

Figure 6A:
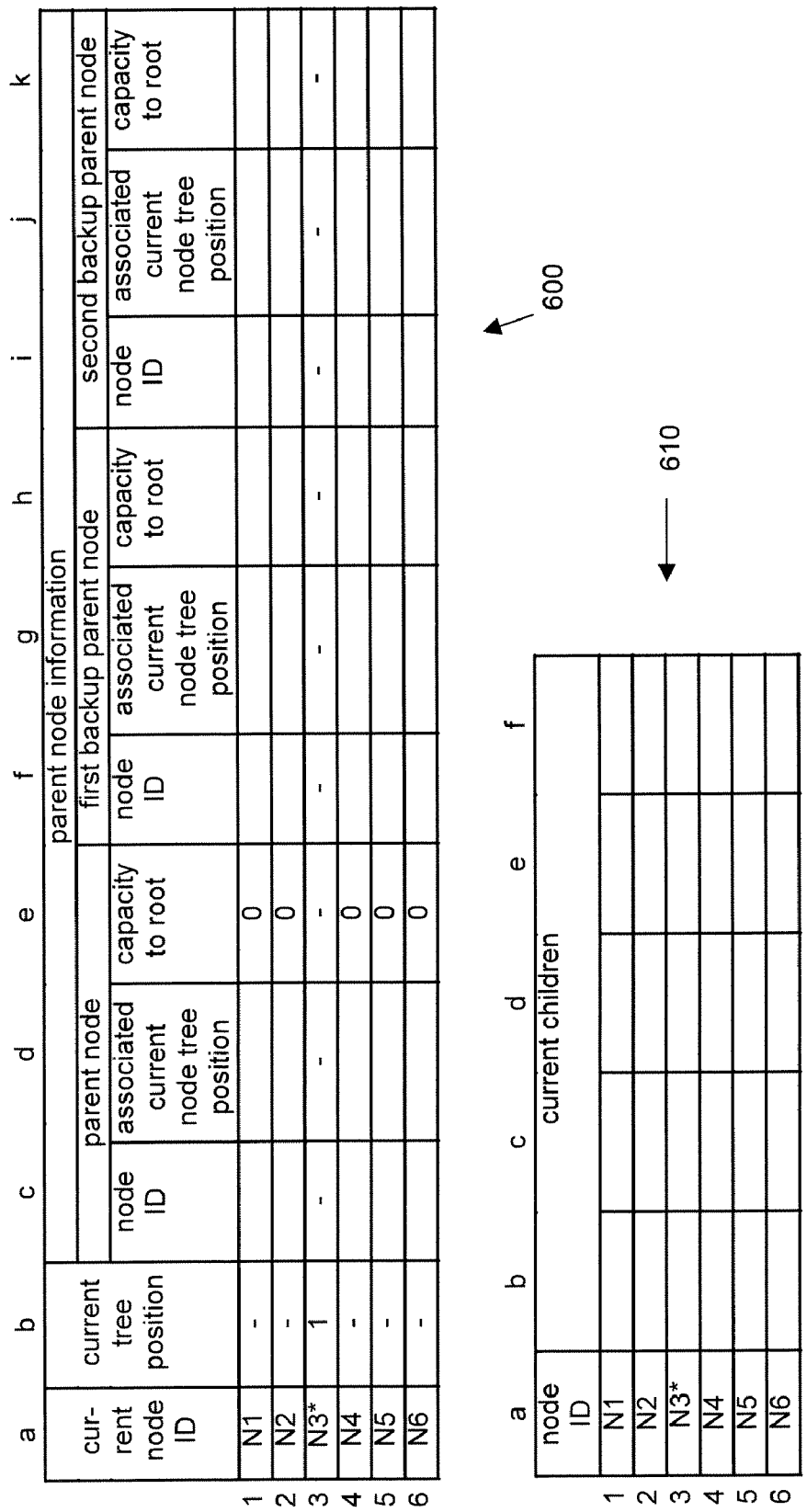
Figure 6B:
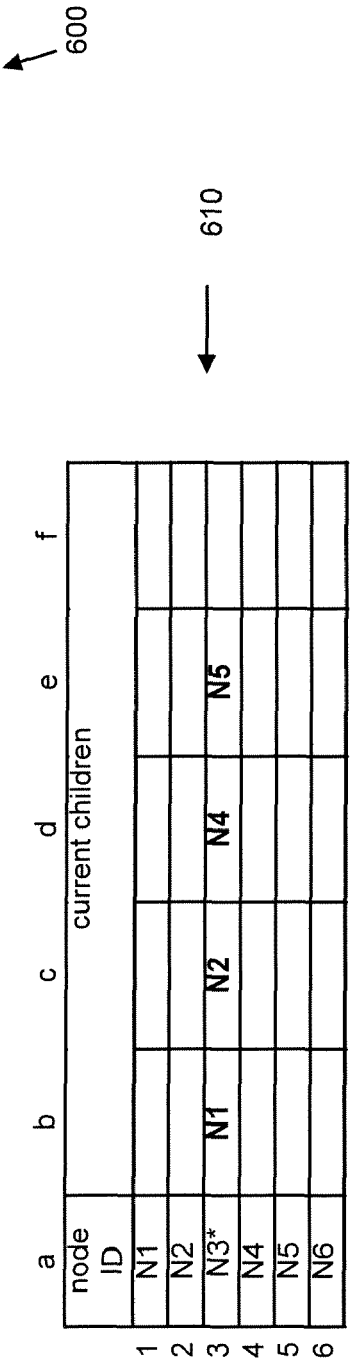
Figure 6F:
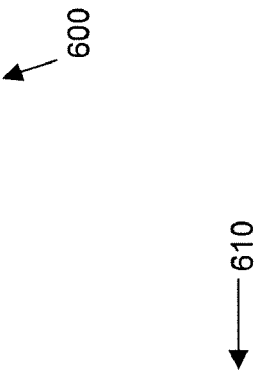
Figure 6G:
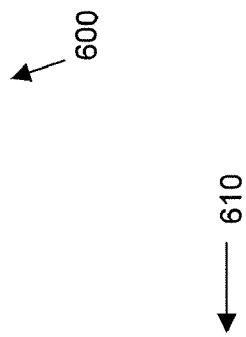

At this stage, node N6 is now free to process buffered message J, and does so in an analogous manner to the processing of message H (FIG. 5D). In particular, because node N5 provides a higher capacity (capacity 8) protection path to the root than node N4 (capacity 4), node N6's protection scheme software 40 accepts node N5 as its primary parent in the tree and demotes node N4 to first backup parent. The associated updates are accordingly made to fields 306, 308 and 310 at node N6, as shown in table 600 entries 6c to 6e (FIG. 6F). It will be appreciated that the previous value in node N6's current tree position field 308 ("1.3.2") is overwritten with the node's new tree position ("1.4.2") to reflect the fact that node N6 has ceased to be the child of node N4 and has taken on node N5 as its new parent. Moreover, the previous values of parent fields 306, 308 and 310 (as shown in table 600 entries 6c to 6e of FIG. 6E) are copied to corresponding first backup parent fields 312, 314 and 316 (table 600 entries 6f to 6h of FIG. 6F) to reflect the fact that node N4 has been "demoted" from primary parent to first backup parent.

Node N6 "ACKs" node N5 in step S418 to confirm its acceptance of node N5's invitation, and in response node N5 updates its child list 324 in step S428 to reflect its new child N6 as shown in table 610 entry 5b of FIG. 6F. Also in step S428, node N5 removes N6 as its first backup parent by clearing protection scheme data fields 312, 314, and 316 as shown in table 600 fields 5f to 5h. The purpose of this action is to ensure that the hierarchical protection tree has no loops (i.e. to eliminate the potential of node N5's child, node N6, of also acting as node N5's parent).

Figure 5G:
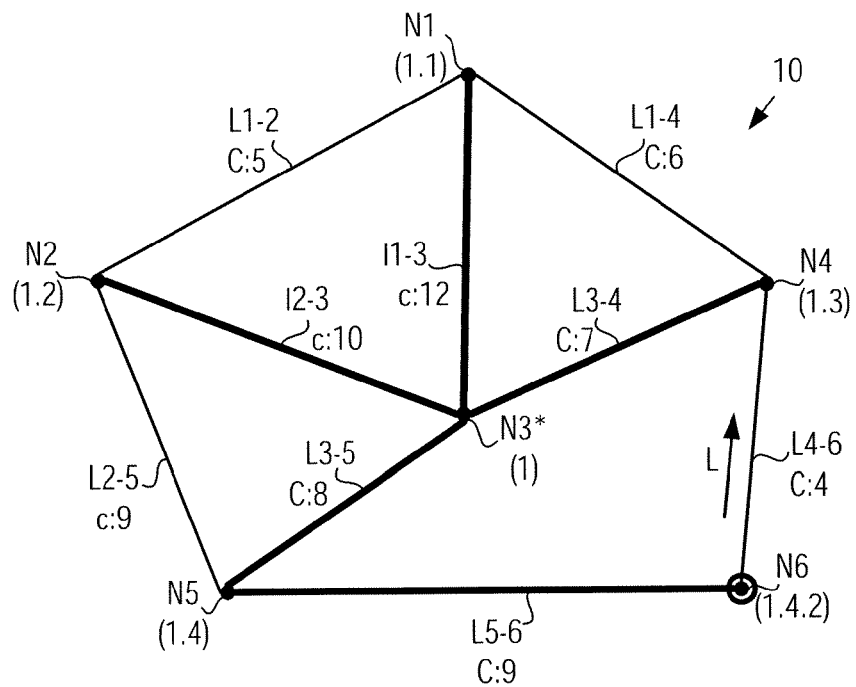

In subsequent step S424, node N6 confirms its new tree position, thus in steps S425 and S426 node N6 proceeds with its processing of message J by broadcasting a "tree position update" message to all other network nodes and then generating and sending a single invitation message L to adjacent node N4 along link L4-6, as shown in FIG. 5G. The content of the invitation message is illustrated in Table V below.

TABLE V

| MESSAGE | CONTENT | | |
|---|---|---|---|
| | NODE ID (field 1) | TREE POSITION (field 2) | CAPACITY TO ROOT (field 3) |
| L | N6 | 1.4.2.1 | 4 |

It will be appreciated that the "capacity to root" field of message L is set to the minimum of the protection capacities of links L3-5, L5-6 and L4-6 (i.e. 4).

At node N4, the message L is received and causes the protection scheme software 40 at that node to advance from its "wait state" (step S402 of FIG. 4A) to step S406 via step S404. At step S406, the software 40 assesses whether the invitation is from a current child. This is achieved by searching the child list 324 portion of the protection scheme data 42 for the node ID "N6". The search reveals that node N6 is in fact currently listed as a child of node N4, this listing being an artifact of node N6's previous acceptance of node N4's invitation message H (FIG. 5D). As a result, in step S408 the sender (node N6) is removed from node N4's child list 324 (as shown in table 610 entry 4b of FIG. 6G). The purpose of this removal is to ensure that no loops exist in the hierarchical protection tree.

The protection scheme software 40 thereafter advances to step S414 (via steps S409 and S410) at which point it is determined that the node N6 should be added as a backup parent due to its inability to provide a more capacious protection path to the root than is currently enjoyed by node N4. In this case, node N4 designates the sender as its second backup parent node in view of the first backup parent's higher protection capacity. This entails the updating of node N4's second backup parent fields 318, 320, 322 with the sender's information as shown in table 600 entries 4i to 4k of FIG. 6G. Node N4 thereafter "NACKs" node N6 and ultimately returns to its "wait state" (step S402). Accordingly, node N6 completes its steps S426 and S428 without having to update any of its records and returns to its wait state (step S402).

Figure 5H:
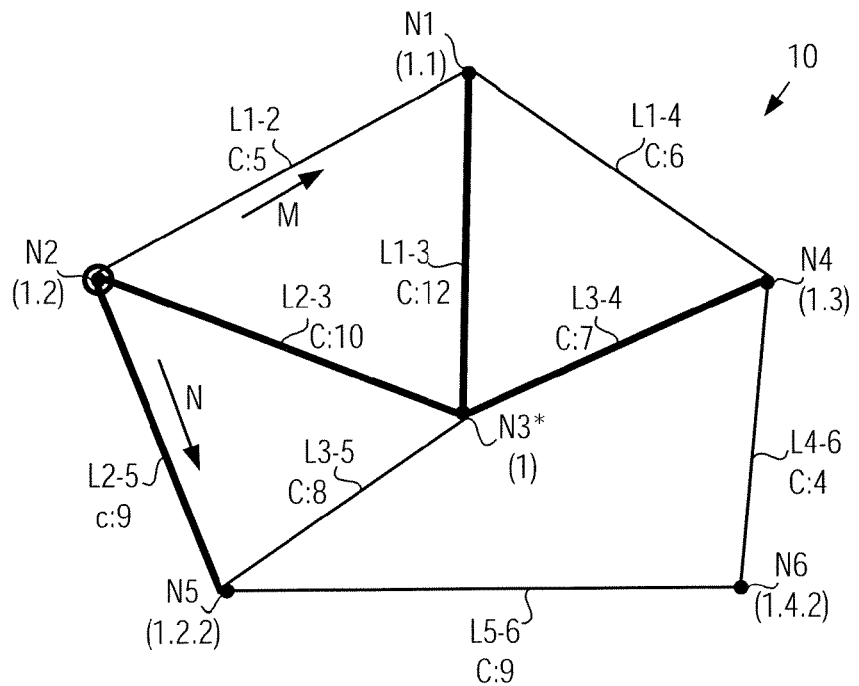

Referring now back to node N2 (which has not yet completed its processing in response to receiving initial message B in FIG. 5B), the execution of step S426 causes two messages M and N to be generated and sent to adjacent nodes N1 and N5 along links L1-2 and L2-5 respectively, as shown in FIG. 5H. The content of these messages is illustrated in Table VI below.

TABLE VI

| MES | CONTENT | | |
|---|---|---|---|
| | NODE ID (field 1) | TREE POSITION (field 2) | CAPACITY TO ROOT (field 3) |
| M | N2 | 1.2.1 | 5 |
| N | N2 | 1.2.2 | 9 |

In the case of message M, the "capacity to root" field (i.e. message field 3) is set to the minimum of the protection capacities of links L2-3 and L1-2 (i.e. 5); in the case of message N, this capacity field is set to the minimum of the protection capacities of links L2-3 and L2-5 (i.e. 9).

At node N1, the message M is received and processed in a similar manner to node N4's message L (FIG. 5G), i.e. the recipient node (N1) accepts the sending node (N2) as its second backup parent. This entails the now familiar updating of node N1's second backup parent fields 318, 320, 322 as shown in table entries 1i to 1k of FIG. 6H. Unlike node N4, however, node N1 does not execute step S408, as the sender (node N2) does not currently appear in its child list 324. Ultimately, node N1 "NACKs" node N2 (step S428) and returns to its "wait state" (step S402).

Meanwhile, at node N5 the receipt of message N causes the protection scheme software 40 to execute steps S404, S406, S410, S414 and S416 to cause node N5 to accept node N2 as its new primary parent in the tree (i.e. node N5 assumes a new tree position 1.2.1). It will be appreciated that this acceptance effectively causes the links L3-5 and L5-6 to no longer be part of the hierarchical protection tree. To implement the acceptance of node N2 as its new parent and the associated demotion of node N3 as backup parent, the existing values in fields 306, 308, and 310, of node N5 are copied to fields 312, 314, and 316 respectively (i.e. the primary parent is "demoted" to first backup parent) and the requisite updates are made to fields 304, 306, 308 and 310 (as shown in table 600 entries 5b to 5h of FIG. 6H) at step S416.

Figure 6H:
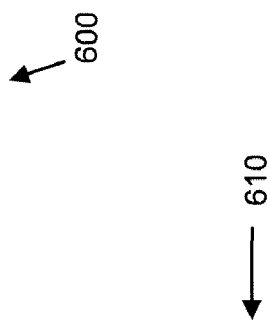
Figure 6I:
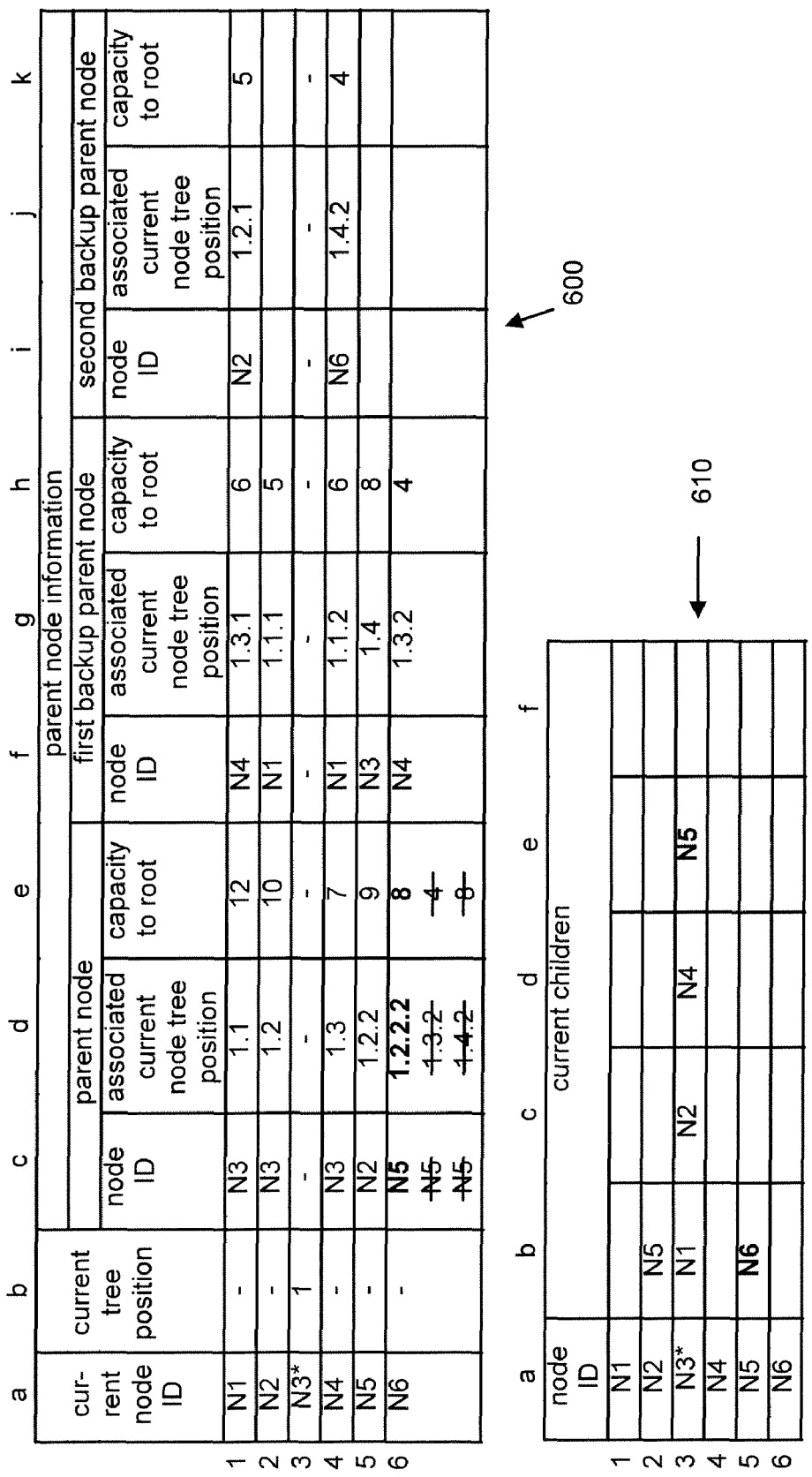
Figure 6J:
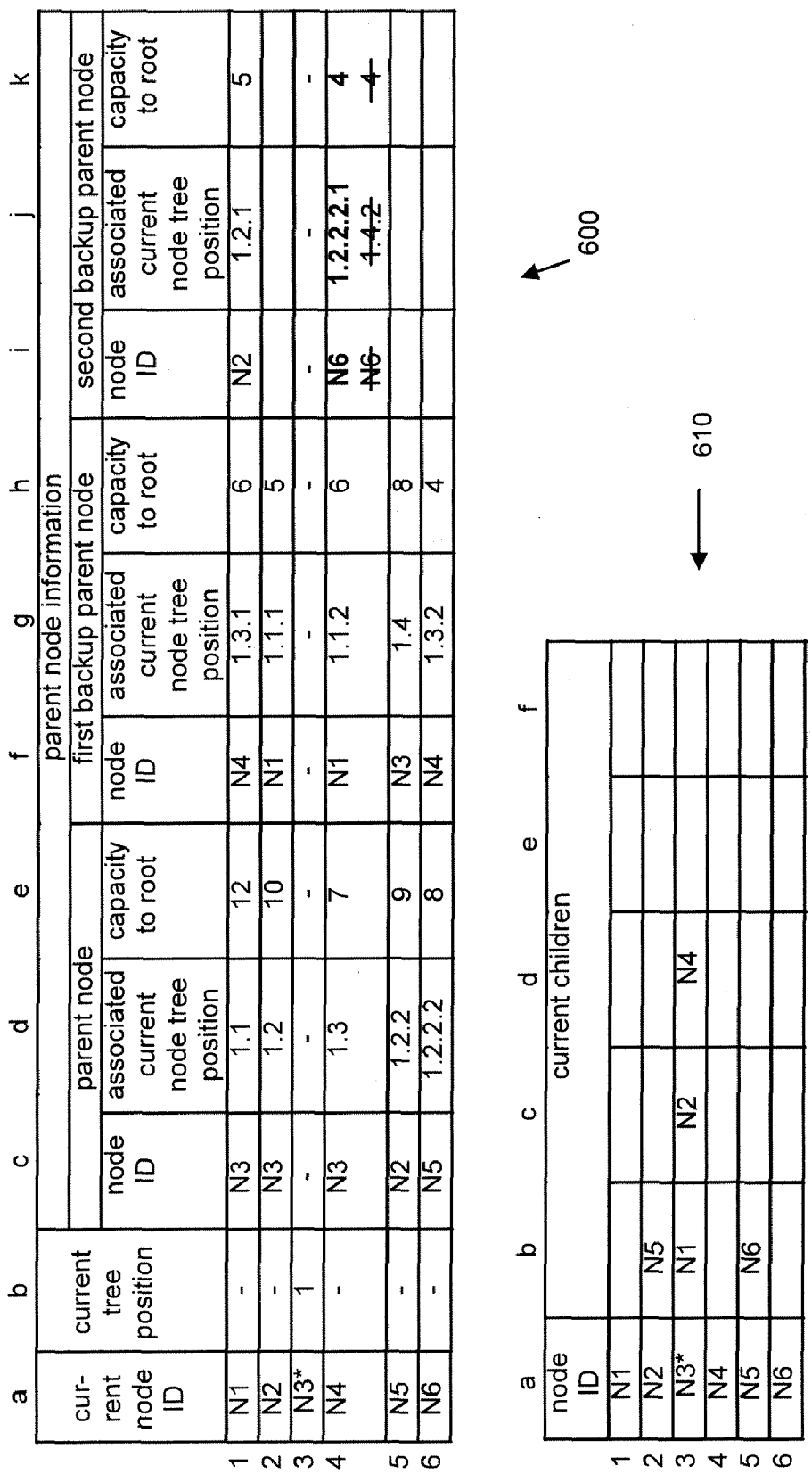

Subsequently, the software 40 of node N5 "ACKs" the sending node N2 (step S418) to confirm its acceptance of node N2's invitation at step S418, and in response node N2 updates its child list 324 in its step S428 to reflect its new child N5 as shown in table 610 entry 2b of FIG. 6H. Also in step S428, node N2 removes N5 from its backup parent records by "promoting" the existing second backup parent node N1 to replace node N5 as first backup parent, as shown in table 600 fields 2f to 2k (to avoid tree loops).

Figure 5I:
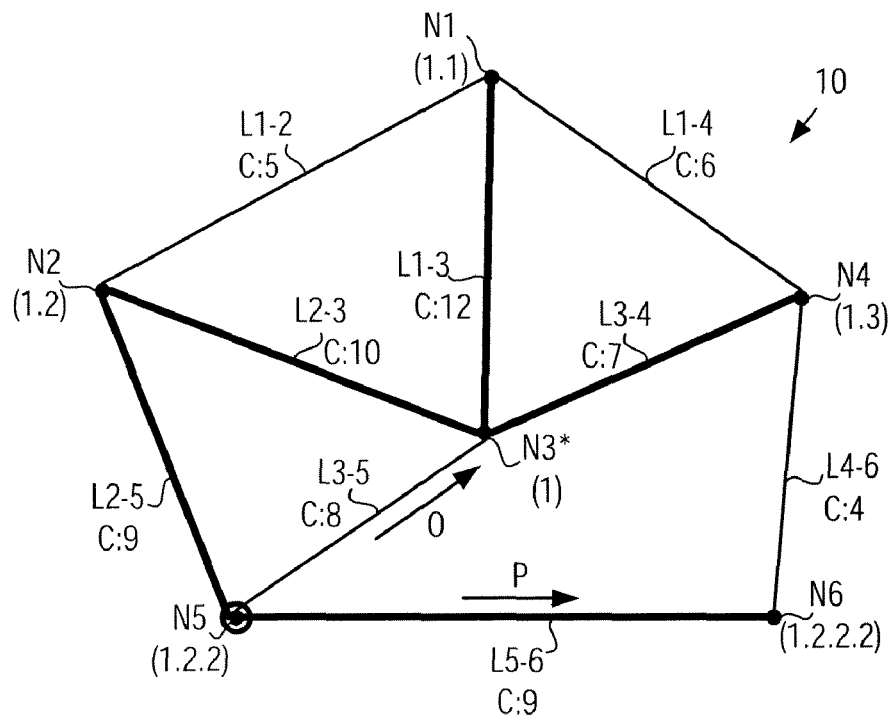

Back at node N5, following a confirmation in step S424 of the fact that node N5's tree position has in fact changed, a "tree position update" message is broadcast to every other node in step S425 and an invitation message is generated and sent to each of node N5's neighbors except the sending node (N2) in step S426. In particular, node N5 sends two invitation messages O and P to adjacent nodes N3 and N6 along links L3-5 and L5-6 respectively, as shown in FIG. 5I and illustrated in Table VII below.

TABLE VII

| MESSAGE | CONTENT | | |
|---|---|---|---|
| | NODE ID (field 1) | TREE POSITION (field 2) | CAPACITY TO ROOT (field 3) |
| O | N3 | 1.2.2.1 | 8 |
| P | N3 | 1.2.2.2 | 9 |

In the case of message O, the "capacity to root" field is set to the minimum of the protection capacities of links L2-3, L2-5 and L3-5 (i.e. 8); in the case of message N, this capacity field is set to the minimum of the protection capacities of links L2-3, L2-5 and L5-6 (i.e. 9).

At node N3 (the root node), the invitation message O is received at step S402 and determined to be an invitation type message at step S404. Subsequently, in step S406 node N3 determines, by examining its child list 324, that the invitation is from a node (N5) that is currently listed as a child of node N3. This determination signifies that node N5 has found a more capacious protection path to the root than direct link L3-5. As a result, the sender's node ID is removed from node N3's child list 324 in step S408 (as shown in table 610 entry 3e of FIG. 6I). Moreover, because node N3 confirms itself to be the root node in step S409, it "NACKs" the sender node N5 in step S411 and returns to its "wait state" at step S402 (any further processing at the root node being skipped because the root node does not accept primary or backup parents).

Meanwhile, at node N6 message P is received. It will be appreciated that message P constitutes a second invitation from node N5 (the first being message J of FIG. 5E) for node N6 to become its child. The receipt of message P at node N6 causes the protection scheme software 40 to advance from step S402 to step S410 via steps S404 and S406 as previously described. At step S410, it is determined that the invitation message P is in fact from a node (N5) that is already listed as the primary parent of node N6. This is of course due to the previous acceptance by node N6 of message J. As a result, in step S412 the sender's information is removed from the fields 306, 308 and 310 and the first backup parent is "promoted" to primary parent, as shown in table 600 entries 6c to 6e of FIG. 6I. This is done because an invitation message from an existing primary or backup parent node is understood to be motivated by the sender's assumption of a new tree position, which indicates that the existing data for that node is now outdated. Deletion of the outdated data permits the recipient to consider the sending node anew for designation as a primary or backup parent.

At subsequent step S414, it is determined that the received capacity (8) is greater than the current capacity to the root (4). Accordingly, in step S416 the node N6 accepts the sender as its primary parent and demotes node N4 to again act as the first backup parent (as shown table 600 entries 6b to 6h of FIG. 6I). Thereafter, in step S418 the sender node N5 is "ACKed" to confirm node N6's acceptance of node N5's invitation to become its child. In response, node N5 updates its child list 324 to reflect that node N6 is its child (in this case, node N6 does not need to be added to child list 324 as it is already listed therein from the previous acceptance by node N6 of message J).

Figure 5J:
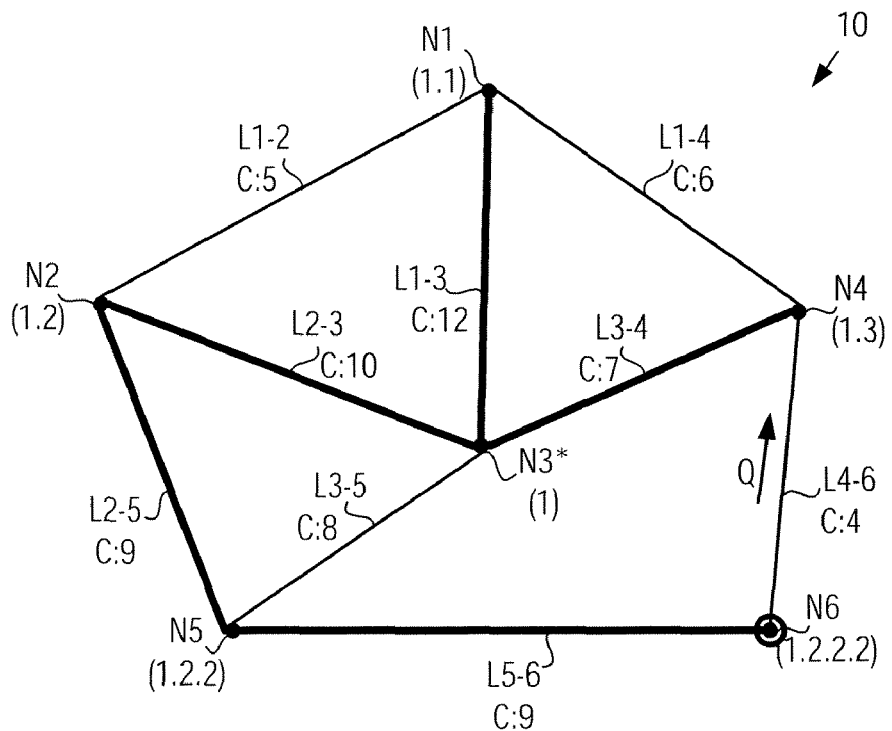

In subsequent step S424 it is determined that the node N6 has in fact taken on a new tree position, thus in the following step S426 the node N6 again broadcasts a "tree position update" message to every other node in step S425 and then generates and sends an invitation message to each of its neighbors except the sending node. More specifically, a message Q is send to adjacent node N4 along link L4-6, as shown in FIG. 5J and illustrated in Table VIII below.

TABLE VIII

| MESSAGE | CONTENT | | |
|---|---|---|---|
| | NODE ID (field 1) | TREE POSITION (field 2) | CAPACITY TO ROOT (field 3) |
| Q | N6 | 1.2.2.2.1 | 4 |

It will be appreciated that the "capacity to root" field of message L is set to the minimum of the protection capacities of links L2-3, L2-5, L5-6 and L4-6 (i.e. 4).

At node N4, the message Q is received and causes the protection scheme software 40 at that node to advance from its "wait state" (S402) to step S406 via step S404. At step S406, the software 40 determines that the invitation is not from a current child. In subsequent step S410, it is determined that the invitation message Q is in fact from a node (N6) that is already listed as the second backup parent of node N6. As a result, in step S412 the sender's information is removed from the fields 318, 320 and 322 (as shown in table 600 entries 4i to 4k of FIG. 6J).

The protection scheme software 40 thereafter advances to step S414 at which point it is determined that the node N6 should be added as a backup parent due to its inability to provide a more capacious protection path to the root than is currently enjoyed by node N4. In this case, node N4 designates the sender as its second backup parent node in view of the first backup parent's higher protection capacity. Node N4's second backup parent fields 318, 320, 322 are updated with the sender's information accordingly as shown in table 600 entries 4i to 4k of FIG. 6G in step S420. Node N4 thereafter "NACKs" node N6 in step S422 and ultimately returns to its "wait state" (step S402). Having received a "NACK" from node N4, node N6 completes step S428 without having to update any of its records and returns to its wait state (step S402).

At this stage the hierarchical protection tree is fully formed and no further messages are sent. Each node is cognizant of the identity of its primary parent node, backup parent nodes and children by way of its locally maintained protection scheme data 42. Advantageously, the formation of the hierarchical protection tree did not require each node to be aware of the entire network topology. Rather, each node was only required to be aware of its immediate neighbors.

It should be appreciated that, in networks having nodes with two or more protection paths to the root of the same minimum protection capacity, the described hierarchical tree-based protection scheme may produce initial hierarchical protection trees of different shapes from run to run. The reason for the potential variability in initial tree shape is that, because the message-driven event loop is executing asynchronously at the various network nodes (with the processor at each node being variably loaded), the sequence in which the messages are processed at the various network nodes may vary from run to run. Nevertheless, even in cases of differently shaped initial trees, each node will still have the same initial minimum capacity to the root despite possibly being differently situated within the tree.

In the event of the failure of a non-tree "straddling" link, the data normally sent along the failed link to an opposing node is redirected up the hierarchical protection tree as high as necessary until it reaches a branch which descends to the opposing node. The network nodes utilize their parent node data (specifically fields 306 and 308), child list 324 data and node position table 326 for this purpose.

For example, in the event that straddling link L4-6 (FIG. 5J) fails, any network traffic normally sent from node N4 to node N6 along link L4-6 is re-routed as follows. Node N4 first compares its tree position indicator ("1.3") with the position indicator of the desired destination node N6 ("1.2.2.2") to deduce the tree position indicator of the lowest level common ancestor node (i.e. the "common root" of both indicators). In the present case, this indicator is "1" (which is the indicator of the lowest level common ancestor node N3). Using this information, node N4 then determines the tree position indicators of the nodes between itself and the destination node in a tree path which includes the common ancestor node:

1.3→1→1.2→1.2.2→1.2.2.2

Subsequently, the unique node IDs of the nodes associated with these tree position indicators is determined through a lookup in node N4's node position table 326:

N4→N3→N2→N5→N6

This information is then encoded into the header of all messages being sent from node N4 to node N6 by way of a source routing scheme, such as the Multi-Protocol Label Switching scheme for example, to cause the message to follow this protection path from the source to the destination node. The protection bandwidth of the associated links is used to carry the redirected data. It will be appreciated that straddling link failures do not affect the structure of the hierarchical protection tree.

Figure 7A:
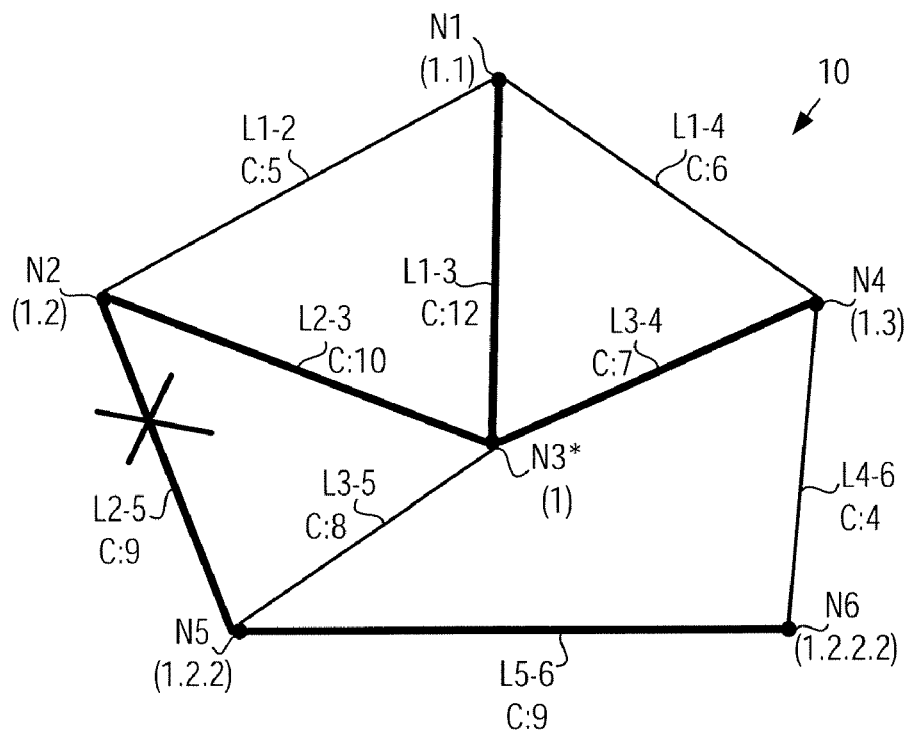
FIGS. 7A and 7B illustrate dynamic tree reconfiguration in the network of FIG. 1 upon the failure of a hierarchical protection tree link.
Figure 7B:
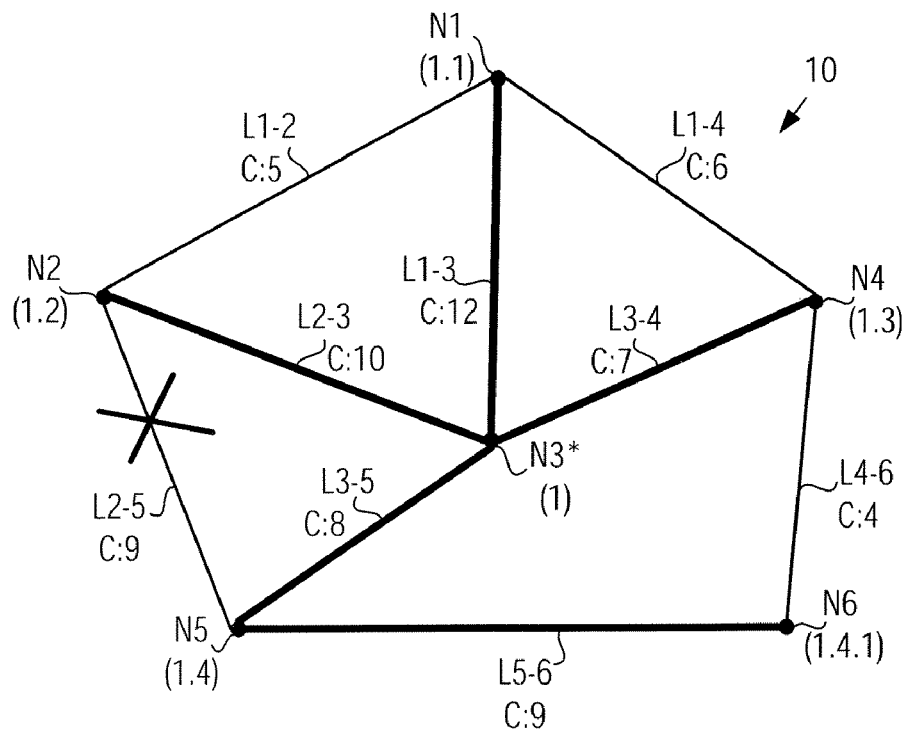

In contrast, in the event of the failure of a tree link, the disconnected child node "reconnects" itself to the tree by promoting its first backup parent to primary parent. This is illustrated in FIGS. 7A, 7B and 8. As may be seen in FIG. 7A, a failure (represented by an "X") occurs in tree link L2-5 which prevents any communication along link L2-5. At node N2, detection of the failure of link L2-5 causes the protection scheme software 40 to delete node N5 from child list 324 (as shown in table 810 entry 2b of FIG. 8). Meanwhile, node N5, which has also detected the link failure, immediately promotes its first backup parent node (N3) to primary parent by updating its fields 306, 308, 310, 312, 314, and 316 appropriately (as illustrated in FIG. 7B and in table 800 entries 5c to 5h of FIG. 8) and thereby assumes a new position "1.4" in the hierarchical protection tree. Advantageously, the fact that the disconnected child node N5 only needs to perform a "table lookup" to connect with its new parent results in a fast protection switching time.

Upon assuming a new tree position, node N5 sends a "parent notification" message (similar to the "ACKs" sent during tree formation) to its new parent node N3 to notify the parent that node N5 is now the parent's child. In response to this message, node N3 adds node N5 to its child list 324 (as shown in table 810 entry 3e of FIG. 8). Node N5 subsequently invites each of its neighbors that is not its new parent to become its child in the hierarchical protection tree in accordance with the same procedure as was used during initial tree formation. This procedure will result in invitation messages being sent from node N5 to N6 and then from N6 to N4. When the hierarchical tree-based protection scheme converges, the restructured hierarchical protection tree and the corresponding protection scheme data 42 at the various network nodes will be as illustrated in FIGS. 7B and 8 respectively. Using the restructured tree, any data normally sent along the failed tree link L2-5 will be re-routed around the failure via node N3 in the same manner as when a straddling link has failed (as described above).

Advantageously, despite the change in network topology (i.e. failed link L2-5), only a subset (nodes N2, N5, N4 and N6) of the totality of six network nodes are required to engage in "reconnection" processing. While the acceptance of a new tree positions by nodes N5 and N6 does result in the broadcast of "tree position update" messages to each network node and the corresponding update of each node's node position table 326, this entails significantly less processing than would be involved in a re-computation of parent, children and associated minimum protection capacities at each network node. The hierarchical tree-based protection scheme of the present embodiment is thus capable (depending on network topology) of limiting any significant impact associated with a network topology change to the network area surrounding the failure.

Figure 9A:
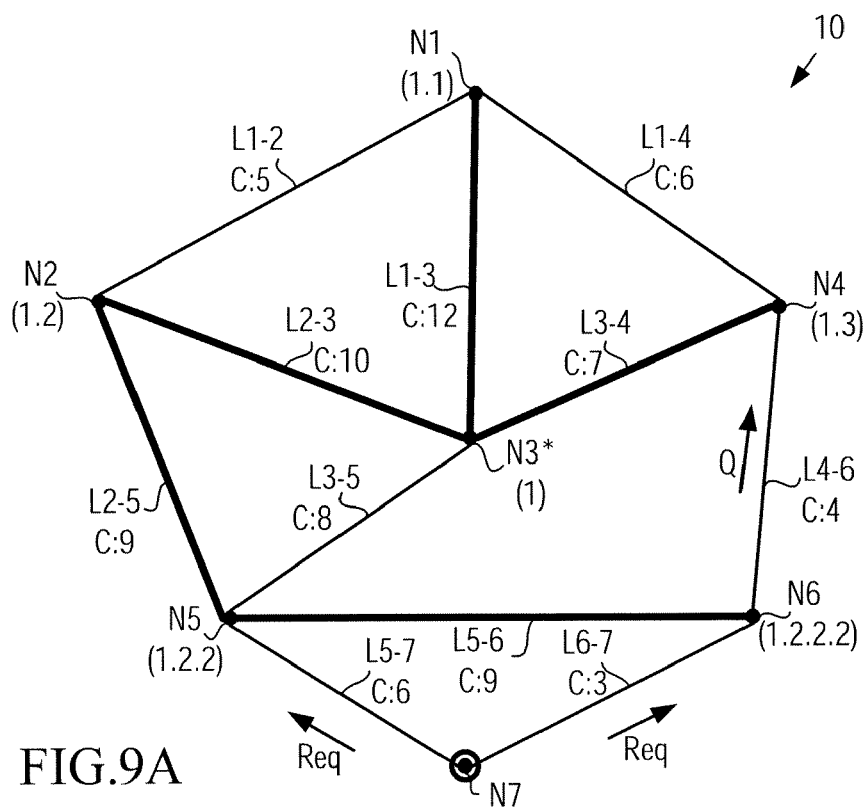
FIGS. 9A and 9B illustrate the addition of an auxiliary network node N7 to the network of FIG. 1.
Figure 9B:
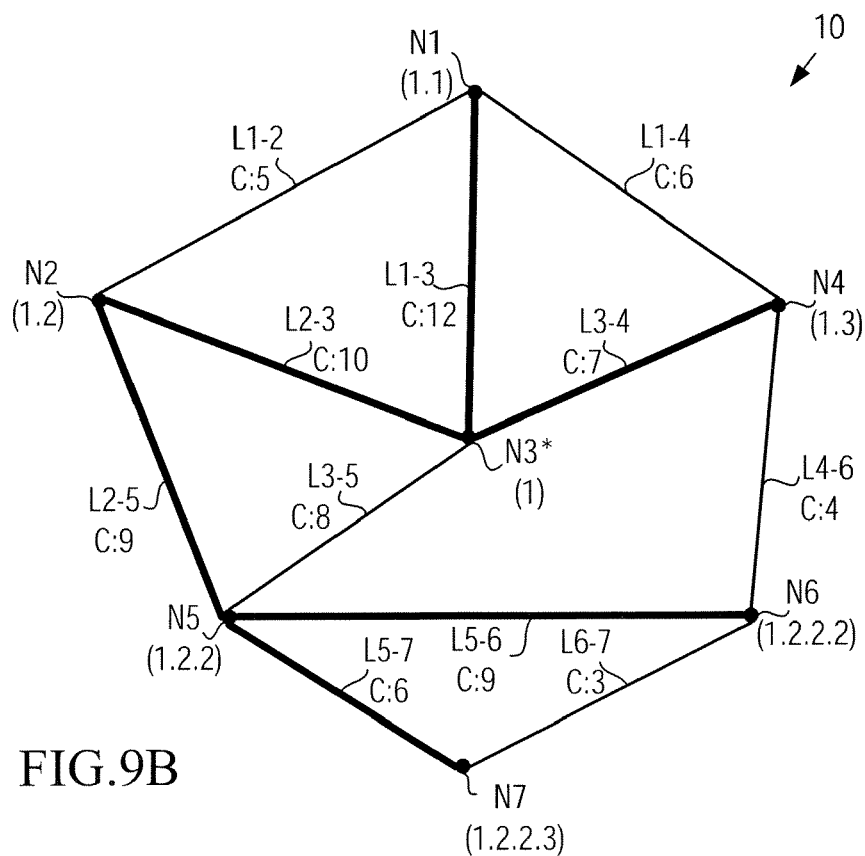
Figure 10:
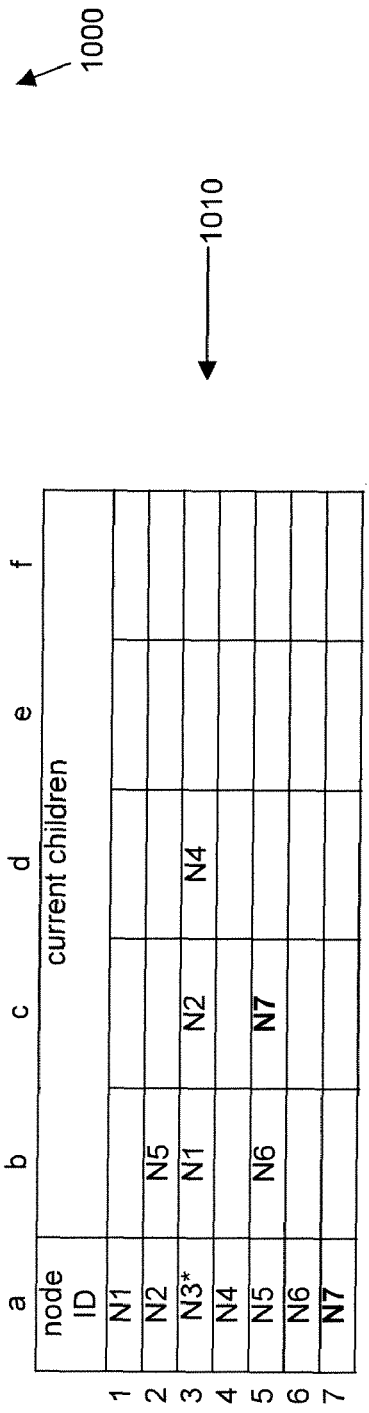
FIG. 10 illustrates the protection scheme data of network nodes N1 to N7 after the addition of the auxiliary network node illustrated in FIGS. 9A and 9B.

The addition of a new node to an existing hierarchical protection tree is illustrated in FIGS. 9A, 9B and 10. FIG. 9A illustrates a new node N7 which has been connected to network 10 by way of a link L5-7 with node N5 and a link L6-7 with node N6. As with the other network nodes, node N7 is assumed to be cognizant of its own ID and the protection capacities of the links to which it is directly connected.

After connecting the new node N7 to the network 10, the network operator 18 interacts with the protection scheme software 40 of node N7 to cause a "request for invitation" message to be sent to each node with which node N7 is connected, as illustrated in FIG. 9A. These request messages contain no data specific to node N7, but rather simply comprise a request for the adjacent node to respond with an invitation message to invite node N7 to become its child.

Each of nodes N5 and N6 respond to the request message by advancing from their wait state S402 (FIG. 4A) to step S430 (FIG. 4B) via step S404. At step S430, each of the respective nodes N5 and N6 generates and sends an invitation message to node N7 analogous to those sent during initial tree formation.

At node N7, the received messages are processed in accordance with the same procedure as was used during initial network formation. Ultimately, node N7 accepts node N5 as its primary parent and node N6 as its first backup parent, with the corresponding updates being made to the protection scheme data 42 at node N7 (as shown in table 1000 entries 7c to 7h). Moreover, in response to node N7's "ACK", node N5 adds the ID "N7" to its child list 324 (as shown in table 1010 entry 5c) to record node N7's status as node N5's child.

In view of its new tree position, the node N7 subsequently broadcasts its new ID to all other nodes, who update their node position tables 326 to note the new node N7 and its tree position "1.2.2.3". Thereafter, node N7 invites node N6 to become its child in accordance with the above-described procedure. As a result, node N6 accepts node N7 as its second backup parent as shown in table 1000 entries 6i to 6k. At this stage no further messages need to be sent and node N7 has become part of the hierarchical protection tree.

As can be seen in the present example, any significant impact of the addition of a network node to a hierarchical protection tree in this manner is advantageously limited to the nodes with which the new node is directly interconnected. In certain cases, additional nodes surrounding those with which the new node is interconnected will also be impacted (e.g. if one of the interconnected nodes adopts the new node as its new primary parent and therefore sends invitation messages to its other neighbors). This is of course network topology dependent.

As will be appreciated by those skilled in the art, modifications to the above-described embodiment can be made without departing from the essence of the invention. For example, it is not necessary for the root node to maintain a value indicative of its own current tree position (field 304), for other nodes to maintain tree positions associated with their primary or backup parents (fields 308, 314 and 320), or for any node to send tree position information (e.g. message field 2) in inter-node messaging (these fields are included in the present embodiment to highlight the tree formation process). Rather, the hierarchical tree-based protection scheme is capable of operating exclusively through the utilization of unique node IDs (e.g. "N1", "N2") to identify parent and backup parent nodes. In such cases, maintenance of certain fields (e.g. fields 304, 308, 314 and 320) would be unnecessary. Of course, in such cases it may be necessary to adjust the algorithm used to determine the path of interim network nodes between a source and destination node during the redirection of network traffic upon a link failure.

Some alternative embodiments may simply employ a different tree position indicator format than described above. Depending upon the chosen format, it may again be necessary to adjust the algorithm used to determine the traffic redirection path upon a link failure.

It is possible that a criterion other than highest average link capacity may be used for initial root selection. Further, the root node may be configured automatically, e.g. by software running at a network management center, rather than being manually selected by the operator.

In some embodiments, a separate computing device from the network element, such as a controller node that is interfaced with the network element, may be used to implement the hierarchical tree-based protection scheme. In such cases, the controller node may not include a network interface 22. Rather, any network messages that are received or sent by the protection scheme software 40 executing on the controller node may be relayed through the associated network element.

It will also be appreciated that spanning tree loop elimination techniques or algorithms other than the one described herein may be used to ensure that the tree is free of loops.

The embodiment(s) of the invention described above is(are) intended to be exemplary only. The scope of the invention is therefore intended to be limited solely by the scope of the appended claims.

What is claimed is:

1. A method of connecting a first node to a spanning hierarchical protection tree in a mesh network, the first node having at least two adjacent nodes, the spanning hierarchical protection tree having a root node, the method comprising:
   the first node receiving a respective invitation from each adjacent node, for inviting the first node to become a child of the respective adjacent node in the spanning hierarchical protection tree; and
   the first node designating as a primary parent of the first node in the spanning hierarchical protection tree one adjacent node that is visited by a protection path from the first node to the root node whose minimum link bandwidth is at least as large as the largest minimum link bandwidth of all other protection paths from the first node to the root node.

2. The method of claim 1 further comprising, prior to receiving the respective invitation from each adjacent node, sending a request for the invitation to each adjacent node.

3. The method of claim 1 wherein the respective invitation received from each adjacent node provides an indication of the minimum link bandwidth of a protection path from the first node to the root node which visits the adjacent node.

4. The method of claim 1 further comprising, sending, from the first node to each adjacent node except the one adjacent node that has been designated as the primary parent of the first node in the spanning hierarchical protection tree, an invitation to become a child of the first node in the spanning hierarchical protection tree.

5. A network node in a mesh network, the network node having at least two adjacent nodes in the mesh network and comprising a processor and memory storing instructions which, when executed by the processor, control the network node to connect to a spanning hierarchical protection tree in the mesh network by:
   receiving a respective invitation from each adjacent node, for inviting the network node to become a child of the respective adjacent node in the spanning hierarchical protection tree; and
   designating as a primary parent of the network node in the spanning hierarchical protection tree one adjacent node that is visited by a protection path from the network node to a root node of the spanning hierarchical protection tree whose minimum link bandwidth is at least as large as the largest minimum link bandwidth of all other protection paths from the network node to the root node.

6. The network node of claim 5 wherein said instructions further control the network node to send, prior to receiving the respective invitation from each adjacent node, a request for the invitation to said each adjacent node.

7. The network node of claim 5 wherein the respective invitation received from each adjacent node provides an indication of the minimum link bandwidth of a protection path from the network node to the root node which visits the adjacent node.

8. The network node of claim 5 wherein said instructions further control the network node to send, from the network node to each adjacent node except the one adjacent node that has been designated as the primary parent of the network node in the spanning hierarchical protection tree, an invitation to become a child of the network node in the spanning hierarchical protection tree.

9. A non-transitory computer readable medium storing computer software instructions that, when executed by a processor of a network node, controls the network node to connect to a spanning hierarchical protection tree in a mesh network by:
   receiving a respective invitation from each one of at least two adjacent nodes of the network node in the mesh network, each invitation for inviting the network node to become a child of the respective adjacent node in the spanning hierarchical protection tree; and
   designating as a primary parent of the network node in the spanning hierarchical protection tree one adjacent node that is visited by a protection path from the network node to a root node of the spanning hierarchical protection tree whose minimum link bandwidth is at least as large as the largest minimum link bandwidth of all other protection paths from the network node to the root node.

10. The computer readable medium of claim 9 wherein said instructions further control the network node to send, prior to receiving the respective invitation from each adjacent node, a request for the invitation to said each adjacent node.

11. The computer readable medium of claim 9 wherein the respective invitation received from each adjacent node provides an indication of the minimum link bandwidth of a protection path from the network node to the root node which visits the adjacent node.

12. The computer readable medium of claim 9 wherein said instructions further control the network node to send, from the network node to each adjacent node except the one adjacent node that has been designated as the primary parent of the network node in the spanning hierarchical protection tree, an invitation to become a child of the network node in the spanning hierarchical protection tree.

* * * * *